United States Patent
Yoshida et al.

(10) Patent No.: US 7,403,455 B2
(45) Date of Patent: Jul. 22, 2008

(54) INFORMATION RECORDING MEDIUM, RECORDING APPARATUS AND METHOD FOR AN INFORMATION RECORDING MEDIUM, REPRODUCING APPARATUS AND METHOD FOR AN INFORMATION RECORDING MEDIUM COMPUTER PROGRAM FOR CONTROLLING RECORD OF REPRODUCTION, AND DATA STRUCTURE INCLUDING CONTROL SIGNAL

(75) Inventors: Masayoshi Yoshida, Tokorozawa (JP); Takeshi Koda, Tokorozawa (JP); Keiji Katata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/715,323

(22) Filed: Mar. 8, 2007

(65) Prior Publication Data

US 2007/0162784 A1    Jul. 12, 2007

Related U.S. Application Data

(62) Division of application No. 10/567,652, filed as application No. PCT/JP2004/010771 on Jul. 22, 2004.

(30) Foreign Application Priority Data

Aug. 12, 2003    (JP)    ............... 2003-207281

(51) Int. Cl.
    *G11B 15/52*    (2006.01)
(52) U.S. Cl. ................. 369/47.14; 369/53.17
(58) Field of Classification Search ....................... None
    See application file for complete search history.

(56) References Cited

U.S. PATENT DOCUMENTS 6,469,978 B1    10/2002    Ohata et al.

7,289,404 B2 *    10/2007    Park et al. ................. 369/53.17
2003/0126527 A1    7/2003    Kim et al.

FOREIGN PATENT DOCUMENTS

| JP | 2-89259 | 3/1990 |
|---|---|---|
| JP | 7-29177 | 1/1995 |
| JP | 9-16966 | 1/1997 |
| JP | 2003-30856 | 1/2003 |

OTHER PUBLICATIONS

McKusick M K et al:, "A Fast File System for UNIX", ACM Transactions on Computer Systems, ACM, New York, NY, US, vol. 2, No. 8, Aug. 1984, pp. 181-197, XP000743135 ISSN: 0734-2071 p. 184, Line 16-Line 26.

Miyamoto H: "DVD-RAM Designed for Data Storage—A Review of the DVD-RAM Format Specificaiton", Internet Citation, [Online] Mar. 10, 1998, XP002172284 Retrieved From the Internet; URL: http://www.itpapers.com/cgi/psummaryit/pl?paperid=156 &scid=163> [Retrieved on Jul. 17, 2001] The Whole Document.

* cited by examiner

*Primary Examiner*—Paul Huber
(74) *Attorney, Agent, or Firm*—Young & Thompson

(57) ABSTRACT

An information recording medium (100) is provided with: a user data area (108) for recording therein record data; a plurality of temporary defect management areas (104, 105) for temporarily recording therein defect management information (120) which is a basis of defect management for a defect in the data area; and a flag area (111) for recording therein distinction information for distinguishing a temporary defect management area in which the defect management information that is effective is recorded, from the plurality of temporary defect management areas, the distinction information being recorded as a type of a combination pattern of an area set to be in a recorded condition and an area left to be in an unrecorded condition according to a predetermined rule, in the flag area.

5 Claims, 13 Drawing Sheets

- 120
- 121 — SETTING INFORMATION
  - START ADDRESS OF USER DATA AREA
  - END ADDRESS OF USER DATA AREA
  - SIZE OF INNER SPARE AREA
  - SIZE OF OUTER SPARE AREA
  - OTHER INFORMATION
- 122 — DEFECT LIST

122

| DEFECT ADDRESS | SPARE ADDRESS | OTHER INFO. |
|---|---|---|
| ADDRESS aaaa | ADDRESS gggg | |
| ADDRESS bbbb | ADDRESS kkkk | |
| ADDRESS cccc | ADDRESS mmmm | |
| ADDRESS dddd | ADDRESS nnnn | |
| ⋮ | ⋮ | |

INFORMATION RECORDING MEDIUM, RECORDING APPARATUS AND METHOD FOR AN INFORMATION RECORDING MEDIUM, REPRODUCING APPARATUS AND METHOD FOR AN INFORMATION RECORDING MEDIUM COMPUTER PROGRAM FOR CONTROLLING RECORD OF REPRODUCTION, AND DATA STRUCTURE INCLUDING CONTROL SIGNAL

This application is a continuation of U.S. application Ser. No. 10/567,652, filed Feb. 9, 2006, which is a 371 of PCT/JP04/10771, filed Jul. 22, 2004.

TECHNICAL FIELD

The present invention relates to an information recording medium, a recording apparatus for and a recording method of recording the record data onto the information recording medium, a reproducing apparatus for and a reproducing method of reproducing the record data recorded on the information recording medium, a computer program for controlling record or reproduction, and a data structure including a control signal for controlling record or reproduction.

BACKGROUND ART

As a technique of improving the reliability of the recording and reading of the record data on a high-density recording medium, such as an optical disc, a magnetic disc, and a magneto optical disc, there is defect management. Namely, when there are scratches or dusts, or deterioration (which are collectively referred to as a "defect") on the recording medium, the data to be recorded or already recorded at the position of the defect is recorded into another area on the recording medium (which is referred to as a "spare area"). In this manner, by evacuating the record data, which is possibly imperfectly or incompletely recorded or read because of the defect, to the spare area, it is possible to improve the reliability of the recording and reading of the record data (refer to Japanese Patent Application Laying Open NO. Hei 11-185390).

In general, a defect list is made to perform the defect management. On the defect list, there are recorded address information for indicating the position of a defect on the recording medium, and address information for indicating the position of the spare area (e.g. a recording position in the spare area) to which the data to be recorded or already recorded at the position of the defect is evacuated.

In general, the defect list is made when an initial logical format for initializing the recording medium or recording file-system data or the like is performed. The defect list is also made when the record data is recorded onto the recording medium. When the record data is recorded and rewritten several times, the defect list is made or updated whenever the record data is recorded and rewritten and a defect area is detected, or whenever the record data is evacuated to the spare area. Moreover, the defect list may be made when the record data is reproduced from the recording medium. For example, if a predetermined number or more of data is error-corrected with respect to a predetermined unit (e.g. a sector unit or and a cluster unit) of the record data when the record data is reproduced, the predetermined unit of the record data is judged or determined to be a defect which cannot be error-corrected in the future and will be an object of the evacuation.

As described above, the defect list is made or updated whenever the record data is evacuated to the spare area.

When the record data is recorded onto the recording medium, the defect list is referred to. This allows the recording of the record data onto the recording medium away from the position of a defect. On the other hand, the defect list is also referred to when the record data recorded on the recording medium is reproduced or read. This makes it possible to surely read both the record data recorded in a normal recording area and the record data recorded in the spare area because of the presence of a defect, on the basis of the defect list.

If the defect list is managed by a recording apparatus itself for recording the data, the defect list is generally recorded into a specific area on the recording medium, which is the object of the making or updating of the defect list. The defect list is read from the recording medium when the record data recorded on the recording medium is reproduced or when other record data is rewritten or additionally recorded (i.e. written once). Then the defect list is referred to in a reading operation by a reading apparatus or in a reproduction operation by a reproducing apparatus.

DISCLOSURE OF INVENTION

If the defect list is managed by the recording apparatus, the defect list is recorded into the specific area on the recording medium. For example, in the case of a rewritable-type optical disc using a blue laser, the defect list is recorded into a predetermined area (which is hereinafter referred to as a "defect management area") reserved in a lead-in area or lead-out area on the disc. The record data to be originally recorded at the position of a defect is also recorded into the specific area on the recording medium.

As described above, the defect list is updated whenever the record data is recorded and rewritten and the defect area is found at the position, or whenever the record data is evacuated to the spare area. Then, the defect list is overwritten or additionally recorded (i.e. written once) in the defect management area on the recording medium which is the object of the recording and rewriting, at an appropriate timing after the defect list is updated by the recording and rewriting of the record data. In addition, the record data to be originally recorded at the position of a defect is also overwritten or additionally recorded (i.e. written once) into the specific area on the recording medium.

Such updating of the defect list by rewriting it can be realized only in case that the recording medium is rewritable-type. In case that the recording medium is a so-called "write-once-type information recording medium", e.g., a write-once-type optical disc, after the defect list is updated, the updated defect list is additionally recorded (i.e. written once) in a new unrecorded or blank area of the information recording medium at an appropriate timing, for example.

However, if the defect list is additionally recorded (i.e. written once), it is hard or impossible to judge, in reproducing, at which position of the recording medium the newest defect list is recorded, and it is necessary to search the reserved area for recording the defect list, thoroughly. Also, even for the recording medium on which the reserved area for recording the defect list is dispersed at a plurality of points, it is necessary to search the plurality of areas thoroughly in the same manner.

In such circumstances, particularly in the high-density recording medium, such as the optical disc, there is the problem that a time length required for searching for the newest defect list increases, and thus that the efficiency of the reproducing or recording deteriorates.

It is therefore an object of the present invention to provide: an information recording medium on which the updated defect list can be efficiently searched for; a recording apparatus for and a recording method of recording the record data onto the information recording medium; a reproducing apparatus for and a reproducing method of reproducing the record data recorded on the information recording medium; a computer program used for the recording apparatus or the reproducing apparatus; and a data structure including a control signal for controlling record or reproduction.

(Information Recording Medium)

The above object of the present invention can be achieved by an information recording medium provided with: a data area for recording therein record data; a plurality of temporary defect management areas for temporarily recording therein defect management information which is a basis of defect management for a defect in the data area; and a flag area for recording therein distinction information for distinguishing a temporary defect management area in which the defect management information that is effective is recorded, from the plurality of temporary defect management areas, the distinction information being recorded as a type of a combination pattern of an area set to be in a recorded condition and an area left to be in an unrecorded condition according to a predetermined rule, in the flag area.

According to the information recording medium of the present invention, the record data which is mainly the object of reproduction or execution and which includes, e.g., image data; audio data; text data; contents data; a computer program; or the like can be recorded into the data area. Then, it is possible to appropriately record and reproduce the record data recorded in the data area by recording, into a control information recording area described later, for example, control information which includes: information for indicating the attribute and type of the information recording medium of the present invention; information for managing the address of the record data; information for controlling the recording and reading operations of a drive apparatus; or the like. Incidentally, the record data and the control information cannot be always clearly classified in accordance with the content thereof. However, the control information is mainly used directly for the operation control of the drive apparatus, while the record data is mainly only the object of recording and reading and is mainly used in a data reproduction operation or in a program execution operation by a backend or a host computer.

The defect management information of the data area is temporarily recorded into the temporary defect management area. The "defect management information" in the present invention is information used for the defect management, and includes: an evacuation source address, which is an address of the position of a defect in the data area; and an evacuation destination address, which is an address of the recording position of evacuation data that corresponds to the record data to be originally recorded or already recorded at the position of the defect. The defect management is as follows. When there is a defect, such as scratches, dusts, or deterioration, in or on the information recording medium of the present invention, the record data is recorded into a position away from the position of the defect. At the same time, the evacuation data is recorded into the spare area which is an area for recording therein the record data away from the defect. Moreover, the following processing is also performed as a part of the defect management: recognizing processing which recognizes the position of a defect when the record data recorded on the information recording medium is reproduced; and reading processing which reads the evacuation data from the spare area.

Moreover, the defect management information is preferably recorded sequentially (i.e. in series or continuously). Even if it is not sequentially recorded, it is possible to obtain a reasonable effect.

For example, the temporary defect management area is an area for temporarily recording therein the defect management information until the information recording medium of the present invention is finalized. Therefore, in reproducing the record data recorded on the information recording medium until it is finalized, the defect management is performed by reading the defect management information from the temporary defect management area.

Particularly, in the present invention, the information recording medium is provided with the plurality of (i.e. two or more) temporary defect management areas, and the effective defect management information is recorded in any one of the areas. The "effect defect management information" in the present invention indicates the newest defect management information and indicates the defect management information having information about the defect detected on the data area at present time. Hereinafter, the temporary defect management area including therein the effective defect management information is referred to as an "in-use temporary defect management area".

In addition, the distinction information is recorded in the flag area, and it indicates in which temporary defect management area the effective defect management information is recorded. Namely, it indicates the in-use temporary defect management area (i.e. the position and address thereof or the like) out of the plurality of temporary defect management areas.

Therefore, when, e.g., the reproducing apparatus described later reproduces the record data, it is possible to specify the temporary defect management area in which the effective defect management information is recorded relatively easily and efficiently by referring to the flag area. If, there is not such a flag area, the reproducing apparatus described later needs to search for the in-use temporary defect management area by thoroughly searching the plurality of temporary defect management areas. However, according to the information recording medium of the present invention, it is possible to search for the in-use temporary defect management area by referring to the flag area without thoroughly searching the plurality of temporary defect management areas as described above. Namely, it is possible to search for the effective defect management information more efficiently, and as a result, it is possible to speed up the reproduction operation.

Moreover, according to the present invention, the distinction information is recorded as a type of a combination pattern of an area set to be in a recorded condition and an area left to be in an unrecorded condition according to a predetermined rule, in the flag area. Here, the "recorded condition" in the present invention indicates such a condition that some record data is written in the flag unit area regardless of whether or not the written record data means something. On the contrary, the "unrecorded condition" in the present invention indicates such a condition that the record data is not written at all. Therefore, it is unnecessary to write the new distinction information into the new flag area whenever the in-use temporary defect management area is changed. Namely, even in the case of the write-once-type, it is possible to write the distinction information, as a combination pattern of the recorded condition and the unrecorded condition in the flag area, by changing the area in the unrecorded condition in the flag area, which is assigned in advance according to the number of the temporary defect management areas, to the area in the recorded condition by writing some data. Therefore, it is unnecessary to increase the flag area or the distinction information in order to write the distinction information which causes such a remarkable effect, as described above. And it is possible to save the area on the information recording medium. Thus, the present invention is extremely useful, particularly for the write-once-type information recording medium.

At this time, information for indicating each position or the like of the plurality of temporary defect management areas on the information recording medium of the present invention may be recorded in the control information recording area described later, for example.

Consequently, according to the information recording medium of the present invention, it is possible to distinguish the in-use temporary defect management area more efficiently. Therefore, it is possible to search for the updated (i.e. the newest) defect management information (i.e. defect list) efficiently. This makes it possible to improve the efficiency of the record or reproduction operation of the record data (i.e. to speed up, to simplify the operation, or the like) even under operating the defect management.

Incidentally, it is preferable that the plurality of temporary defect management areas area used in series or continuously. Namely, after a free space (or unrecorded area) runs out in one temporary defect management area, it is preferable to use another temporary defect management area. It is also preferable that the order to use is determined in advance. The information may be recorded in the control information recording area described later, in other areas, or the like.

Moreover, the information recording medium of the present invention is preferably a write-once-type information recording medium. Even if it is a rewritable-type information recording medium, it is possible to properly receive the benefits owned by the information recording medium of the present invention.

In one aspect of the information recording medium of the present invention, if the information recording medium is provided with "n" temporary defect management areas (n: integral number, n≧2), the flag area includes "n−1" flag unit areas.

According to this aspect, it is possible to distinguish the "n" temporary defect management areas by using the "n−1" flag unit areas. Here, the "flag unit area" in the present invention indicates a recording area having a predetermined size included in the flag area. Namely, the above-described distinction information is shown by using the combination of the "n−1" flag unit areas. Moreover, if the "n−1" flag unit areas is equipped, even on the write-once-type information recording medium, which is capable of recording the record data only once at each position, it is possible to distinguish the temporary defect management area including therein the effective defect management information from the "n" temporary defect management areas.

Particularly, as the "n" takes a large number, it is more difficult to specify the temporary defect management area in which the effective defect management information is recorded. The reason is that more searching processes are necessary in order to search all the temporary defect management areas thoroughly. According to the information recording medium of the present invention, it is possible to efficiently search for it regardless of the number of temporary defect management areas.

As described above, in an aspect of the information recording medium including the "n−1" flag unit areas, the distinction information is indicated as an entire flag area by that each of the "n−1" flag unit areas is in the recorded condition or in the unrecorded condition.

By constituting in this manner, the type of the above-described combination pattern is constructed by combining two types of conditions owned by each of the "n−1" flag unit areas. As a result, it is possible to distinguish the in-use temporary defect management area.

With respect to the write-once-type information recording medium, if once the flag unit area is set to be in the recorded condition, it is difficult to set the flag unit area to be in the unrecorded condition. However, even in the case of the write-once-type information recording medium, if the "n−1" flag unit areas are provided, as described above, it is possible to appropriately record them as the distinction information, according to the type of the combination pattern obtained by combining the recorded condition and the unrecorded condition.

As descried above, in an aspect of the information recording medium on which each of the flag unit areas is in the recorded condition or in the unrecorded condition, backup data corresponding to the record data is recorded into at least one flag unit area in the recorded condition out of the "n−1" flag unit areas.

By constituting in this manner, the flag unit area can function not only as the flag area but also as a backup area. By this, it is possible to give the two functions to the flag unit areas of the flag area, and it is possible to receive the benefits owned by the information recording medium of the present invention.

Incidentally, it may be constructed not to limited to record therein the backup data, but to record therein the record data that is intended to be used for some application after recording. Alternatively, it may be constructed to record therein the record data having some meanings for other applications.

In an aspect of the information recording medium having the "n−1" flag unit areas, each of the "n−1" flag unit areas corresponds to the smallest recording area of the information recording medium.

By constituting in this manner, it is possible to reduce recording capacity for reserving as the flag area much more. Therefore, it is possible to search for the in-use temporary defect management area by using the flag area while keeping down the recording capacity required for the flag area.

Moreover, by setting each flag unit area to the smallest recording area of the information recording medium, it is possible to record the information into the flag area, as one portion of a normal record operation on the recording apparatus described later, and it is possible to read the information from the flag area, as one portion of a normal reproduction operation on the reproducing apparatus described later.

Incidentally, even if each of the "n−1" flag unit areas is not the smallest recording area in size but an area having an arbitrary size, it is possible to receive the various benefits owned by the above-described information recording medium of the present invention. The sizes of the "n−1" flag unit areas may be the same, or may be different from each other.

In another aspect of the information recording medium of the present invention, the flag area is disposed on an inner circumferential side of the information recording medium.

According to this aspect, it is easy to access the flag area, for example. Therefore, it is possible to reduce a processing load required for the distinction of the in-use temporary defect management area.

Incidentally, even if the flag area is not on the inner circumferential side, e.g., even if it is on an outer circumferential side of the information recording medium or at an arbitrary position, it is possible to distinguish the in-use temporary defect management area.

In another aspect of the information recording medium of the present invention, the information recording medium is further provided with a control information recording area for recording therein information for controlling at least one of recording and reading with respect to the data area, the flag area being disposed in the control information recording area.

According to this aspect, it is possible to refer to the distinction information included in the flag area at the same time of accessing the control information in reproducing or recording. Therefore, it is possible to refer to the distinction information as a series of operations accompanying the normal operations in initial setting or the like of the information recording medium, for example. This makes it possible to select the in-use temporary defect management area more efficiently. As a result, it is possible to search for the updated defect management information relatively easily and more efficiently.

Incidentally, the control information recording area may include a definite defect management area for recording therein the defect management information. This makes it possible to maintain the compatibility between the write-once-type information recording medium out of the information recoding medium of the present invention and the rewritable-type information recording medium, for example.

In another aspect of the information recording medium of the present invention, the flag area is disposed in one temporary defect management area out of the plurality of temporary defect management areas.

According to this aspect, it is possible to record the distinction information without mixing it with the record data, which includes the audio data and the video data or the like.

If the temporary defect management area to be accessed first is determined by default on the recording apparatus or reproducing apparatus described later, for example, the flag area is preferably disposed in the temporary defect management area to be accessed first. This makes it possible to obtain the effective defect management information more efficiently.

Incidentally, even if the flag area is not disposed in the temporary defect management area, for example, even if disposed in the data area or the spare area or the like, it is possible to distinguish the in-use temporary defect management area.

As described above, in an aspect of the information recording medium wherein the flag area is disposed in the one temporary defect management area, the flag area is disposed at an end portion of the one temporary defect management area.

According to this aspect, it is possible to facilitate the access to the flag area on the recording apparatus and the reproducing apparatus described later, for example.

The start address and the size or the like of the temporary defect management area can be recognized relatively easily because it is disposed in the above-described control information recording area.

(Recording Apparatus and Method)

The above object of the present invention can be achieved by a recording apparatus for recording record data onto an information recording medium provided with: (i) a data area for recording therein the record data; (ii) a plurality of temporary defect management areas for temporarily recording therein defect management information which is a basis of defect management for a defect in the data area; and (iii) a flag area for recording therein distinction information for distinguishing a temporary defect management area in which the defect management information that is effective is recorded, from the plurality of temporary defect management areas, the distinction information being recorded as a type of a combination pattern of an area set to be in a recorded condition and an area left to be in an unrecorded condition according to a predetermined rule, in the flag area, the recording apparatus provided with: a first recording device for recording at least one of the record data and the defect management information; and a second recording device for updating and recording the distinction information, if the temporary defect management area in which the effective defect management information is recorded is changed, by changing the area left to be in the unrecorded condition to the area in the recorded condition according to the changed temporary defect management area and thus by changing the combination pattern.

According to the recoding apparatus of the present invention, it is possible to appropriately record the record data onto the above-described information recording medium of the present invention by using the first and second recording devices, which includes: an optical pickup; a controller for controlling the optical pickup; or the like, for example.

Specifically, firstly, the first recording device records the record data into the data area of the information recording medium. In the meantime, the defect management information, which includes, e.g., the defect list for indicating the position of a defect on the information recording medium, is made by a defect-management-information generating device on the recording apparatus of the present invention, for example. It may be constructed such that the made or obtained defect management information is stored into a memory device which includes a memory such as RAM.

Then, the first recording device records the defect management information made in this manner into the temporary defect management area. There may be various times when the first recording device records the defect management information into the temporary defect management area, but the times described as following is conceivable: e.g., immediately after the information recording medium is initialized or formatted; after a series of record data is recorded onto the information recording medium; immediately after a defect is detected by checking the recording (by verifying); or the like. In addition, the first recording device records the evacuation data into the spare area.

Particularly in the present invention, if the temporary defect management area in which the effective defect management information is recorded is changed between before and after the recording of the defect management information by the first recording device, the second recording device records or updates the distinction information. Namely, if the area in which the effective defect management information is recorded is changed from one temporary defect management area to another temporary defect management area out of the plurality of temporary defect management areas, for example, the second recording device records the fact as the distinction information into the flag area. Specifically, the second recording device changes the area left to be in the unrecorded condition to the area in the recorded condition and thus changes the combination pattern. This makes it possible to appropriately record and update the distinction information into the flag area.

Consequently, according to the recording apparatus of the present invention, it is possible to appropriately record the record data onto the above-described information recording medium of the present invention, and also it is possible to receive various benefits owned by the information recording medium.

Incidentally, in response to various aspects of the above-described information recording medium of the present invention, the recording apparatus of the present invention can also take various aspects.

Moreover, it may be constructed such that the defect management information is obtained from the information recording medium or via other communication channels. In this case, it is preferably constructed such that the defect management information generating device is capable of obtaining the defect management information from the information recording medium or via the other communication channels, in place of making or updating the defect management information.

If the information recording medium is an optical recording medium, an optical pickup is preferable as a direct recording device for directly recording the data or information onto the information recording medium. If the information recording medium is magnetic, magneto optical, or other types, such as a type of using the change of a dielectric constant, a pickup, a head, or a probe or the like suitable for the type of the information recording medium may be used.

The above object of the present invention can be achieved by a recording method of recording record data onto an information recording medium provided with: (i) a data area for recording therein the record data; (ii) a plurality of temporary defect management areas for temporarily recording therein defect management information which is a basis of defect management for a defect in the data area; and (iii) a flag area for recording therein distinction information for distinguishing a temporary defect management area in which the defect management information that is effective is recorded, from the plurality of temporary defect management areas, the distinction information being recorded as a type of a combination pattern of an area set to be in a recorded condition and an area left to be in an unrecorded condition according to a predetermined rule, in the flag area, the recording method provided with: a first recording process of recording at least one of the record data and the defect management information; and a second recording process of updating and recording the distinction information, if the temporary defect management area in which the effective defect management information is recorded is changed, by changing the area left to be in the unrecorded condition to the area in the recorded condition according to the changed temporary defect management area and thus by changing the combination pattern.

According to the recording method of the present invention, as with the above-described recording apparatus of the present invention, it is possible to appropriately record the record data onto the above-described information recording medium of the present invention (including its various aspects), and also it is possible to receive various benefits owned by the information recording medium.

Incidentally, in response to various aspects of the above-described recording apparatus (or the information recording medium) of the present invention, the recording method of the present invention can also take various aspects.

(Reproducing Apparatus and Method)

The above object of the present invention can be achieved by a reproducing apparatus for reproducing record data recorded on an information recording medium provided with: (i) a data area for recording therein the record data; (ii) a plurality of temporary defect management areas for temporarily recording therein defect management information which is a basis of defect management for a defect in the data area; and (iii) a flag area for recording therein distinction information for distinguishing a temporary defect management area in which the defect management information that is effective is recorded, from the plurality of temporary defect management areas, the distinction information being recorded as a type of a combination pattern of an area set to be in a recorded condition and an area left to be in an unrecorded condition according to a predetermined rule, in the flag area, the reproducing apparatus provided with: a selecting device for reading the distinction information and selecting the temporary defect management area in which the effective defect management information is recorded from the plurality of temporary defect management areas; a reading device for reading the effective defect management information from the selected temporary defect management area; and a reproducing device for reproducing the record data recorded in the data area on the basis of the read defect management information.

According to the reproducing apparatus of the present invention, it is possible to appropriately reproduce the record data recorded on the above-described information recording medium of the present invention, by using the reading device, which includes: an optical pickup; a controller for controlling the optical pickup; or the like, and the reproducing device, which includes: a decoder for converting the image data to a image signal which can be displayed on a display; or the like.

Specifically, at first, the selecting device, which includes a Control Processing Unit (CPU) or the like, reads the distinction information recorded in the flag area. Particularly, the CPU recognizes the area in the recorded condition and the area in the unrecorded condition in the flag area, and reads the distinction information by distinguishing the type of the combination pattern. Then, the CPU selects the temporary defect management area in which the effective defect management information is recorded, from the recording content of the distinction information. Then, the reading device reads the effective defect management information recorded in the selected (i.e. in-use) temporary defect management area. The effective defect management information may be stored into the memory device, such as a memory. In recording, the record data is recorded away from a defect in the data area on the information recording medium. Namely, the record data to be recorded or already recorded at the position of the defect in the data area is evacuated to the spare area, for example. Thus, in order to reproduce the record data recorded in this manner, it is necessary to know the position of the defect in the data area. Thus, the reproducing device recognizes the position of the defect in the data area on the basis of the defect management information (i.e. the effective defect management information) read by the reading device and recognizes the position at which the record data is recorded away from the defect, thereby to reproduce the record data recorded in the data area or the evacuation data recorded in the spare area.

Consequently, it is possible to appropriately reproduce the record data recorded on the above-described information recording medium, and also it is possible to receive various benefits owned by the information recording medium.

Incidentally, in response to various aspects of the above-described information recording medium of the present invention, the reproducing apparatus of the present invention can also take various aspects.

In one aspect of the reproducing apparatus of the present invention, the flag area has a plurality of flag unit areas and each of the plurality of flag unit areas is in the recorded condition or in the unrecorded condition, and the selecting device selects the temporary defect management area in which the effective defect management information is recorded by judging in which condition of the recorded condition and the unrecorded condition at least one of said plurality of flag unit areas is.

According to this aspect, it is possible to obtain the effective defect management information relatively easily by referring to the distinction information which is recorded by appropriately combining the two types of recording conditions of the recorded condition and the unrecorded condition.

The above object of the present invention can be achieved by a reproducing method of reproducing record data recorded on an information recording medium provided with: (i) a data area for recording therein the record data; (ii) a plurality of temporary defect management areas for temporarily recording therein defect management information which is a basis of defect management for a defect in the data area; and (iii) a flag area for recording therein distinction information for distinguishing a temporary defect management area in which the defect management information that is effective is recorded, from the plurality of temporary defect management areas, the distinction information being recorded as a type of a combination pattern of an area set to be in a recorded condition and an area left to be in an unrecorded condition according to a predetermined rule, in the flag area, the reproducing method provided with: a selecting process of reading the distinction information and selecting the temporary defect management area in which the effective defect management information is recorded from the plurality of temporary defect management areas; a reading process of reading the effective defect management information from the selected temporary defect management area; and a reproducing process of reproducing the record data recorded in the data area on the basis of the read defect management information.

According to the reproducing method of the present invention, as with the above-described reproducing apparatus of the present invention, it is possible to appropriately reproduce the record data recorded on the information recording medium of the present invention (including its various aspects), and also it is possible to receive various benefits owned by the information recording medium.

Incidentally, in response to various aspects of the above-described reproducing apparatus (or the information recording medium) of the present invention, the reproducing method of the present invention can also take various aspects.

(Computer Program)

The above object of the present invention can be achieved by a first computer program for recording control to control a computer provided in the above-described recording apparatus of the present invention (including its various aspects) to make the computer function as at least one of the first recording device and the second recording device.

According to the first computer program for recording control of the present invention, the information recording apparatus of the present invention mentioned above may be realized relatively easily, by reading and running the computer program from a recording medium, such as a ROM, a CD-ROM, a DVD-ROM, a hard disk and so on, which stores the computer program thereon, or by downloading the computer program to the computer via the communication device and running it.

Incidentally, in response to various aspects of the above-described information recording medium of the present invention, the first computer program of the present invention can also take various aspects.

The above object of the present invention can be achieved by a second computer program for reproduction control to control a computer provided in the above-described reproducing apparatus of the present invention (including its various aspects) to make the computer function as at least one of the selecting device, the reading device, and the reproducing device.

According to the second computer program for reproduction control of the present invention, the information reproducing apparatus of the present invention mentioned above may be realized relatively easily, by reading and running the computer program from a recording medium, such as a ROM, a CD-ROM, a DVD-ROM, a hard disk and so on, which stores the computer program thereon, or by downloading the computer program to the computer via the communication device and running it.

Incidentally, in response to various aspects of the above-described information recording medium of the present invention, the second computer program of the present invention can also take various aspects.

The above object of the present invention can be also achieved by a first computer program product for record control in a computer-readable medium for tangibly embodying a program of instructions executable by a computer provided for the above-mentioned recording apparatus of the present invention (including various aspects), the program making the computer function as at least one portion of the first recording device and the second recording device.

The above object of the present invention can be also achieved by a second computer program product for reproduction control in a computer-readable medium for tangibly embodying a program of instructions executable by a computer provided for the above-mentioned reproducing apparatus of the present invention (including various aspects), the program making the computer function as at least one portion of the selecting device, the reading device and the reproducing device.

According to the first or second computer program product of the invention, at least one portion of the first recording device, the second recording device, the selecting device, the reading device and the reproducing device of the present invention mentioned above may be embodied relatively easily, by reading and running the first or second computer program product from a record medium, such as a ROM, a CD-ROM, a DVD-ROM, a hard disk and so on, which stores the computer program thereon, or by downloading the first or second computer program product to the computer via the communication device and running it. More specifically, the first or second computer program product may be made of computer readable codes (or computer readable commands) to make the computer function as at least one portion of the first recording device, the second recording device, the selecting device, the reading device and the reproducing device.

(Data Structure Including Control Signal)

The above object of the present invention can be achieved by a data structure provided with: a data area for recording therein record data; a plurality of temporary defect management areas for temporarily recording therein defect management information which is a basis of defect management for a defect in the data area; and a flag area for recording therein distinction information for distinguishing a temporary defect management area in which the defect management information that is effective is recorded, from the plurality of temporary defect management areas, the distinction information being recorded as a type of a combination pattern of an area set to be in a recorded condition and an area left to be in an unrecorded condition according to a predetermined rule, in the flag area.

According to the data structure including a control signal of the present invention, as in the case of the above-described information recording medium of the present invention, it is possible to search for the defect management information (the defect list) efficiently. Namely, it is possible to receive various benefits owned by the information recording medium.

Incidentally, in response to various aspects of the above-described information recording medium of the present invention, the data structure including a control signal of the present invention can also take various aspects.

The nature, utility, and further features of this invention will be more clearly apparent from the following detailed description with reference to preferred embodiments of the invention when read in conjunction with the accompanying drawings briefly described below.

As explained above, according to the information recording medium of the present invention, it is provided with: the data area; the temporary defect management areas; and the flag area. The distinction information is recorded as the type of the combination pattern in the flag area. Therefore, it is possible to search for the defect management information efficiently and use it.

According to the recording apparatus of the present invention, it is provided with: the first recording device; and the second recording device. According to the recording method of the present invention, it is provided with: the first recording process; and the second recording process. Therefore, it is possible to appropriately record the record data onto the information recording medium of the present invention. According to the reproducing apparatus of the present invention, it is provided with: the selecting device; the reading device; and the reproducing device. According to the recording method of the present invention, it is provided with: the selecting process; the reading process; and the reproducing process. Therefore, it is possible to appropriately read and reproduce the record data from the information recording medium of the present invention.

BEST MODE FOR CARRYING OUT THE INVENTION

Embodiments of the present invention will be explained with reference to the drawings hereinafter. In the embodiments below, the information recording medium of the present invention is applied to a write-once-type optical disc, and the recording apparatus and the reproducing apparatus of the present invention are applied to a recording/reproducing apparatus for the write-once-type optical disc.

(Embodiment of Information Recording Medium)

Figure 1:
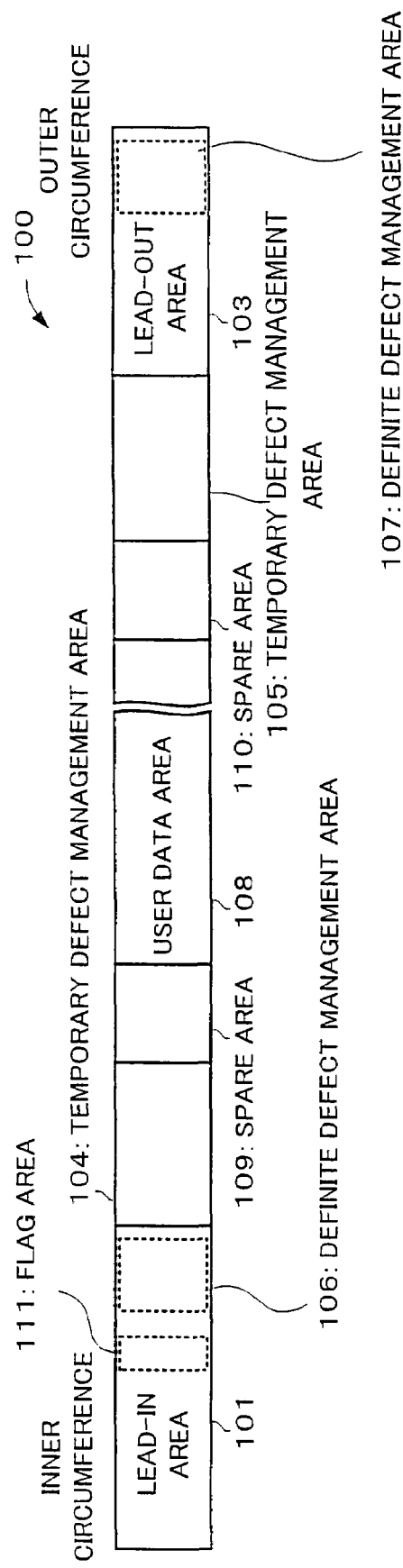
FIG. 1 is an explanatory diagram showing an embodiment of an information recording medium of the present invention.

Firstly, the recording structure of the write-once type optical disc in the embodiment of the present invention and the information and data recorded on the optical disc will be explained. FIG. 1 shows the recording structure of the write-once-type recording medium which is the embodiment of the present invention. Incidentally, the left side of FIG. 1 is the inner circumferential side of a write-once-type optical disc 100, and the right side of FIG. 1 is the outer circumferential side of the optical disc 100.

As shown in FIG. 1, there is a lead-in area 101 on the most inner circumferential side on a recording surface of the write-once-type optical disc 100, and there are a temporary defect management area 104, a spare area 109, a user data area 108, a spare area 110, a temporary defect management area 105, and a lead-out area 103, placed toward the outer circumferential side.

In both the lead-in area 101 and the lead-out area 103, the control information for controlling the recording and reading of information or data with respect to the optical disc 100 and the management information for managing the same are recorded. The lead-in area 101 is provided with a definite defect management area 106. The lead-out area 103 is also provided with a definite defect management area 107. In both the defect management areas 106 and 107, defect management information 120 (refer to FIG. 2) is to be recorded.

Particularly in the embodiment, a flag area 111 is disposed in the lead-in area 101. The flag area 111 is an area for recording therein the distinction information for distinguishing in which of the temporary defect management areas 104 and 105 the effective defect management information 120 is recorded (i.e. which of the temporary defect management areas 104 and 105 is in use). The "effective defect management information 120" is the defect management information 120 for indicating a newest condition of the optical disc 100. Incidentally, the flag area 111 will be described in detail later (refer to FIG. 7).

Incidentally, in the embodiment, the flag area 111 is disposed in the lead-in area 101. However, not to limited to this, the embodiment may be constructed such that it is disposed in the temporary defect management area 104 (105) or in the lead-out area 103 or in other areas, for example. It may be constructed such that the position or the like of such a flag area 111 is indicated by the information recorded in setting information 121 described later or the information recorded in the lead-in area 101 or the like.

Into the user data area 108, the record data, such as image data, audio data, and contents data, is recorded. The spare areas 109 and 110 are alternative recording areas for evacuating thereto the record data from a defect in the user data area 108. Namely, when there is a defect in the user data area 108, the record data to be recorded or already recorded at the position of the defect (which is hereinafter referred to as the "evacuation data", as occasion demands) is alternatively recorded into the spare area 109 or 110.

Into the both the temporary defect management areas 104 and 105, the defect management information 120 is recorded temporarily. Incidentally, the defect management information 120 is also recorded into the definite defect management areas 106 and 107. Differences between the definite defect management areas 106/107 and the temporary defect management areas 104/105 will be described later.

Next, the defect management information 120 will be explained. The defect management information 120 is used for the defect management performed by a recording/reproducing apparatus 200 (refer to FIG. 9). The recording/reproducing apparatus 200 performs the defect management when recording the record data onto the optical disc 100 or when reproducing the record data from the optical disc 100. In the embodiment, the defect management is mainly as follows. When there is a defect, such as scratches, dusts, or deterioration, on the user data area 108 on the optical disc 100, the record data is recorded away from the position of the defect, and at the same time, the evacuation data is recorded into the spare area 109 or 110. Moreover, the following operations are also performed as a part of the defect management: an operation of recognizing the position of the defect when the record data recorded in the user data area 108 is reproduced; and an operation of reading the record data to be originally recorded or already recorded at the position of the defect from the spare area 109 or 110. In order to perform such a defect management, the recording/reproducing apparatus 200 needs to recognize the position of the defect in the user data area 108. The defect management information 120 is mainly used for the recording/reproducing apparatus 200 to recognize the position of the defect.

Figures 2, 3:
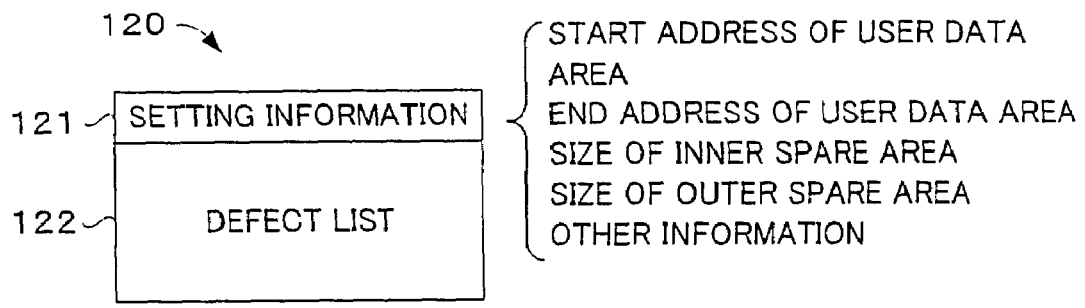
FIG. 2 is an explanatory diagram showing the content of defect management information in the embodiment.
FIG. 3 is an explanatory diagram showing one example of a defect list in the embodiment.

FIG. 2 shows the content of the defect management information 120. As shown in FIG. 2, the setting information 121 and a defect list 122 are included in the defect management information 120.

The setting information 121 includes: a start address of the user data area 108; an end address of the user data area 108; the size of the inner spare area 109; the size of the outer spare area 110; and other information, as shown in FIG. 2.

FIG. 3 shows the content of the defect list 122. As shown in FIG. 3, on the defect list 122, there are recorded an address for indicating the position of a defect in the user data area 108 (which is hereinafter referred to as a "defect address"), an address for indicating the recording position in the spare area 109 or 110 of the evacuation data (which is hereinafter referred to as a "spare address"); and other information. When there are a plurality of defects in the user data area 108, a plurality of defect addresses and spare addresses corresponding to the defects are included in the defect list 122.

Incidentally, the defect management can be performed not only for the user data area 108 on the optical disc 100 but also for all of the recording surfaces of the optical disc 100.

Next, an aspect of the recording of the defect management information 120 will be explained. The temporary defect management areas 104/105 on the optical disc 100 and the definite defect management areas 106/107 are areas for recording therein the defect management information 120. However, The temporary defect management areas 104/105 and the definite defect management areas 106/107 differ in their locations, sizes, and purposes for use. Hereinafter, their differences will be specifically explained.

Figure 4:
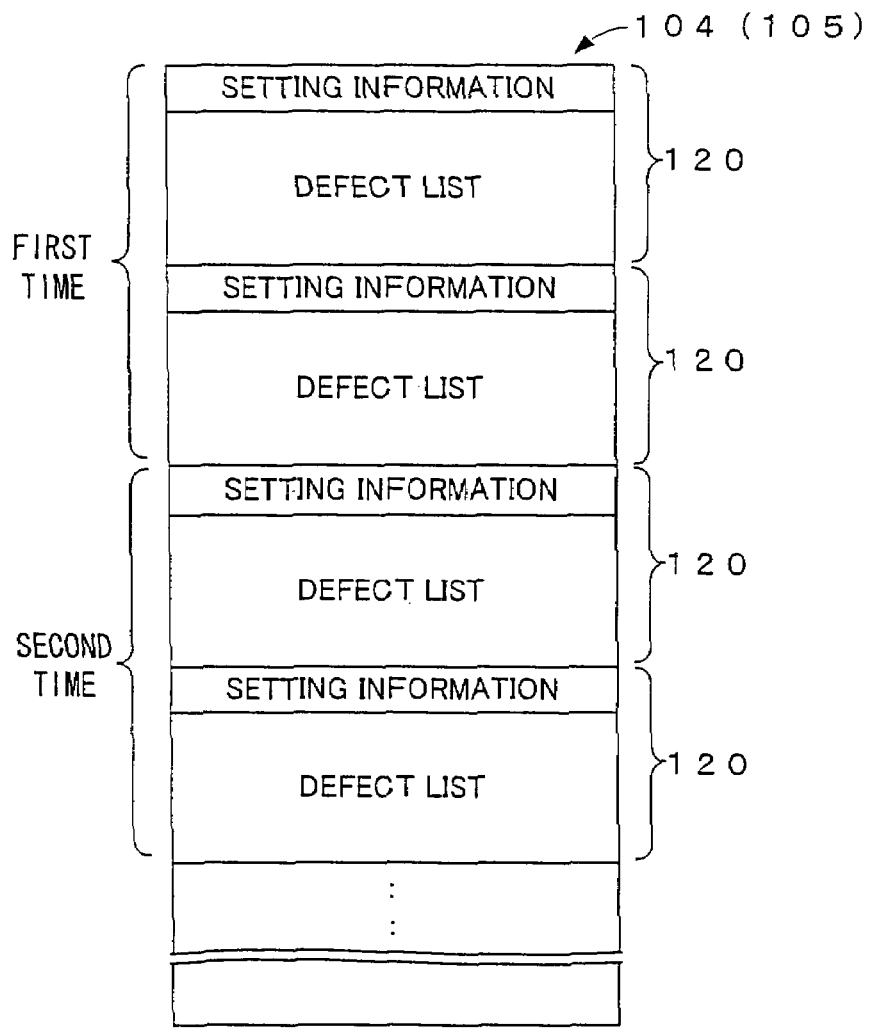
FIG. 4 is an explanatory diagram showing one example of the record content of a temporary defect management area in the embodiment.

FIG. 4 shows one example of the condition that the defect management information 120 is recorded in the temporary defect management area 104 or 105. The temporary defect management areas 104 and 105 are areas for recording therein the defect management information 120 temporarily until the optical disc 100 is finalized. The defect management information 120 is necessary for the defect management. The presence or absence and the position of a defect are different for each optical disc, so that it is necessary to record and maintain the defect management information 120 on each optical disc. In the example, at a stage before the finalizing, the defect management information 120 is recorded and maintained in the temporary defect management area 104 or 105 on the optical disc 100.

Moreover, in the embodiment, as shown in FIG. 4, it is preferable that the defect management information 120 is recorded twice repeatedly or redundantly into the temporary defect management area 104 or 105 (Incidentally, FIG. 4 shows the four defect management information 120 in total because the repetitive or redundant recording of the defect management information 120 is performed twice). This makes it possible to surely record and reproduce the defect management information 120. Even if the recording of the defect management information 120 is not performed twice, for example, once, or three times or more, it is possible to appropriately record and reproduce the defect management information 120 and the evacuation data.

Until the optical disc 100 is finalized, the defect management information 120 may be updated several times in some cases. For example, if dusts are attached onto the optical disc 100 between the first recording and the second recording (i.e., additional or sequential or postscript recording), the defect (or dusts) is detected upon the second recording. On the basis of this detection, the defect list 122 is updated. When the defect list 122 is updated, the defect management information 120 including the updated defect list 122 is additionally recorded (i.e. written once) into the temporary defect management area 104 or 105. The optical disc 100 is a write-once-type recording medium, so that it is impossible to overwrite the updated defect management information 120 on the existing defect management information 120. Thus, as shown in FIG. 4, the updated defect management information 120 is recorded in series after the existing defect management information 120. Therefore, the above-described "effective defect management information 120" in this case indicates the defect management information 120 additionally written at the second time.

In order to realize such repeated and serial recording of the defect management information 120, the temporary defect management areas 104 and 105 are larger than the definite defect management areas 106 and 107.

Moreover, the defect management information 120 is preferably recorded in series (sequentially) into the temporary defect management area 104 or 105 as shown in FIG. 4. With respect to the temporary defect management area 104 or 105, it is preferable to determine the recording order of the defect management information 120 in advance.

Particularly in the embodiment, when the defect management information 120 is updated, if the temporary defect management area into which the defect management information 120 is to be recorded is changed, the distinction information of the flag area 111 is also updated. Namely, for example, if the free space of the temporary defect management area 104 runs out and the defect management information 120 is subsequently recorded into the temporary defect management area 105, the distinction information of the flag area 111 is updated. Therefore, the distinction information at this time indicates that the effective defect management information 120 is recorded in the temporary defect management area 105. The specific construction of the distinction information will be described in detail later (refer to FIG. 7 or the like).

Figure 5:
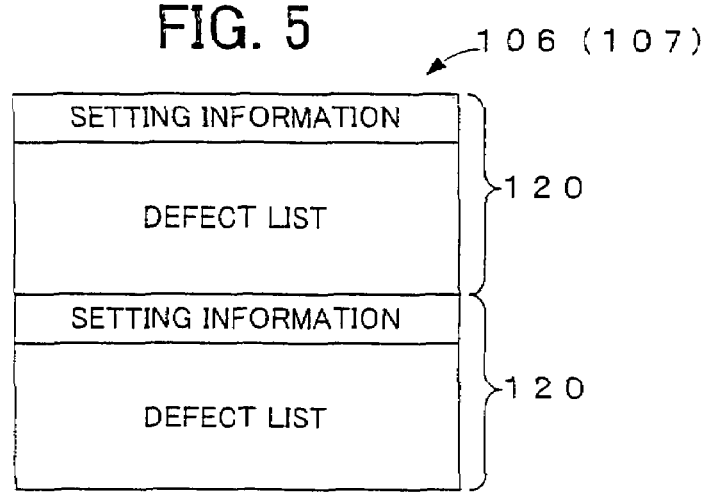
FIG. 5 is an explanatory diagram showing one example of the record content of a temporary defect management area in the embodiment.

FIG. 5 shows one example of the condition that the defect management information 120 is recorded in the definite defect management area 106 or 107. The definite defect management areas 106 and 107 are areas for recording therein the defect management information 120 definitely when the optical disc 100 is finalized. Namely, at a stage before the finalizing, the definite defect management areas 106 and 107 are unrecorded (or blank). When the optical disc 100 is finalized, the defect management information 120 is recorded in the definite defect management areas 106 and 107, and the recording situation is continued subsequently.

In the example, as shown in FIG. 5, it is preferable that the defect management information 120 is recorded twice repeatedly or redundantly into the definite defect management area 106 or 107. This makes it possible to surely record and reproduce the defect management information 120. Even if the recording is not performed twice, for example, once, or three times or more, it is possible to appropriately record and reproduce the defect management information 120.

According to the optical disc 100 in the embodiment, the temporary defect management area 104 is placed between the lead-in area 101 and the spare area 109 and the temporary defect management area 105 is placed between the spare area 110 and the lead-out area 103, which allows the compatibility between the write-once-type optical disc 100 and a general rewritable optical disc. In order to realize the compatibility with a general rewritable-type optical disc, the write-once-type optical disc 100 needs to have the lead-in area, the spare area, the user data area, the spare area, and the lead-out area, and needs to maintain a basic recording structure, such as the order, position, and size (area) of the areas. The optical disc 100 maintains such a basic recording structure although it is provided with the temporary defect management areas 104 and 105, which allows the compatibility. Namely, if the temporary defect management area 104 is placed in the lead-in area 101, because the temporary defect management area 104 is relatively large as described above, there is no choice to extend the size of the lead-in area 101, which is unfavorable. In this example, however, such a disadvantage does not occur because the temporary defect management area 104 is placed out of the lead-in area 101. Moreover, if the temporary defect management area 104 is placed in the user data area 108, the defect management information 120 having properties of control information is included in the user data area 108 which is an area in which record data is supposed to be recorded, causing the disadvantage that the control information and the record data, which is information having properties different from those of the control information, are mixed in the user data area 108. In this example, however, such a disadvantage does not occur because the temporary defect management area 104 is placed out of the user data area 108. The same is true for the defect management area 105.

The start address and end address of the user data area 108, and the each start address of the spare areas 109 and 110 (or the size of the user data area 108 and the spare areas 109 and 110, or the like) are included in the setting information 121 in the defect management information 120 (refer to FIG. 2). This setting information 121 can be set by the recording/reproducing apparatus 200. Namely, it is allowed to change the start address and end address of the user data area 108 and the each size of the spare areas 109 and 110 if they are clearly shown as the setting information 121. Even if they are changed, it is possible to maintain the compatibility with a general rewritable-type recording medium. Therefore, it is possible to ensure a space between the lead-in area 101 and the user data area 108 by shifting the start address of the user data area 108 backward (to the outer circumferential side), and it is possible to place the temporary defect management area 104 in the space. Depending on how to set the start address of the user data area 108, it is possible to reserve or ensure the relatively wider (large-sized) temporary defect management area 104. The same is true for the temporary defect management area 105.

According to the optical disc 100, the definite defect management areas 106 and 107 are placed in the lead-in area 101 and the lead-out area 103, respectively, which allows the compatibility between the write-once-type optical disc 100 and a general rewritable optical disc. Namely, a general rewritable optical disc has areas to record the defect management information, the areas being placed in both the lead-in area and the lead-out area. The optical disc 100 also has the definite defect management areas 106 and 107 placed in the lead-in area 101 and the lead-out area 103, respectively. At this point, their recording structures coincide. Therefore, it is possible to ensure the compatibility between the write-once-type optical disc 100 and a general rewritable-type optical disc.

Figure 6:
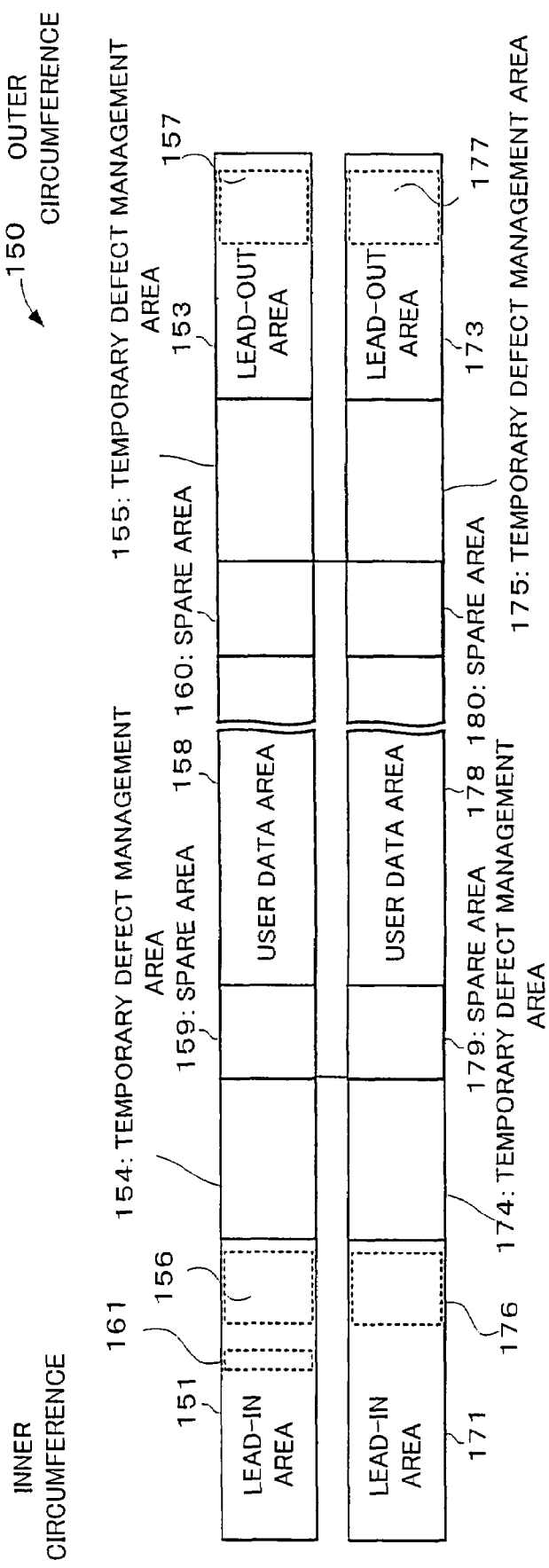
FIG. 6 is an explanatory diagram showing another embodiment of the information recording medium of the present invention.

Incidentally, in the above-described embodiment, the case where the information recording medium of the present invention is applied to an one-layer optical disc is taken as an example. The present invention, however, is not limited to this example and can be applied to a two-or-more-layer optical disc. FIG. 6 shows an example of the case where the information recording medium of the present invention is applied to a two-layer optical disc. In a first layer of a two-layer optical disc 150 in FIG. 6 (the upper side of FIG. 6), as in the optical disc 100, there is a lead-in area 151 on the most inner circumferential side, and there are placed, toward the outer circumferential side, a temporary defect management area 154, a spare area 159, a user data area 158, a spare area 160, a temporary defect management area 155, and a lead-out area 153. A flag area 161 is disposed in the lead-in area 151. In a second layer, as in the optical disc 100, there is a lead-in area 171 on the most inner circumferential side, and there are placed, toward the outer circumferential side, a temporary defect management area 174, a spare area 179, a user data area 178, a spare area 180, a temporary defect management area 175, and a lead-out area 173.

Incidentally, in the explanation associated with the two-or-more-layer optical disc in FIG. 6, an example of a parallel track path is shown in which the recording direction of the first layer is the same as that of the second layer, but a form of an opposite track path may be adopted in which the recording direction of the first layer is opposite to that of the second layer.

Figure 7:
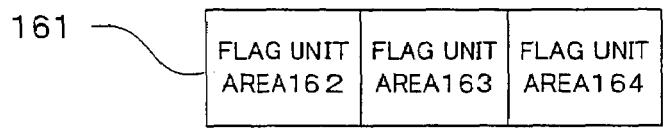
FIG. 7 is an explanatory diagram schematically showing a data structure of a flag area in the embodiment.

Next, with reference to FIG. 7 and FIGS. 8, the data structure of the flag area will be explained in detail. FIG. 7 shows the more detailed data structure of the flag area 161 in the two-layer optical disc 150. FIG. 8A to FIG. 8D schematically show one specific example of an aspect of the recording of the flag area 161 which changes according to the in-use temporary defect management area.

As shown in FIG. 7, there are three flag unit areas (162, 163, and 164) in the flag area 161. Each size of the three flag unit areas corresponds to the size of an area for an Error-Correcting Code (ECC) cluster of the optical disc 100. It is possible to use not only the area for the ECC cluster but also an arbitrary area as the flag unit area of the flag area 161.

Then, according to the recording condition of the data in the three flag unit areas, it is shown in which area of the temporary defect management areas 154, 155, 174, and 175 the effective defect management information 120 is recorded. Namely, all the three flag unit areas show information corresponding to the above-described distinction information. In the embodiment, according to whether each is in the recorded condition or in the unrecorded condition, the three flag unit areas 162, 163, and 164 show the temporary defect management area in which the effective defect management information 120 is recorded.

The "recorded condition" in the embodiment indicates such a condition that pits are formed in the flag unit area, and the pits may indicate the predetermined record data or does not have to indicate it. On the other hand, the "unrecorded condition" indicates such a condition that the pits are not formed in the flag unit area and that it has a recording layer corresponding to a mirror-like flat surface.

Incidentally, the number of the flag unit areas is preferably smaller than the number of the temporary defect management areas provided for the optical disc, only by one. Namely, if there are "n" temporary defect management areas provided for the optical disc (n: integral number, n≧2), the number of the flag unit areas is preferably "n−1". For example, in the case of the optical disc 100 in FIG. 1, since there are two temporary defect management areas, the number of the flag unit areas may be one. For example, in the case of the optical disc 150 in FIG. 6, since there are four temporary defect management areas, the number of the flag unit areas is preferably three, as shown in FIG. 7.

Next, with reference to FIG. 8A to FIG. 8D, one specific example of the recording conditions of the flag unit areas 162, 163, and 164 will be explained.

Figure 8A:
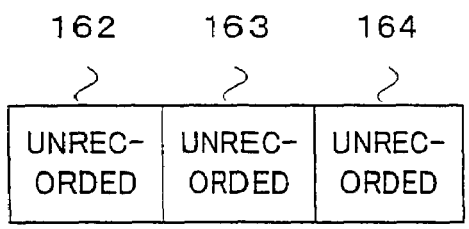
FIG. 8A to FIG. 8D are schematic diagrams showing a recording condition of the flag area in the embodiment.

As shown in FIG. 8A, if all of the flag unit areas 162, 163, and 164 are in the unrecorded condition, that indicates, for example, the temporary defect management area 154 is effective (i.e. in-use). Namely, that indicates the effective defect management information 120 is recorded in the temporary defect management area 154.

Figure 8B:
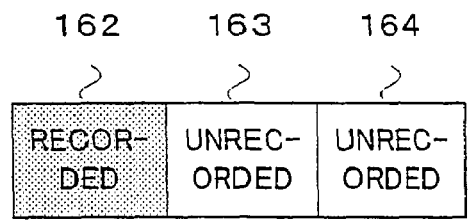

As shown in FIG. 8B, if the flag unit area 162 is in the recorded condition and the flag unit areas 163 and 164 are in the unrecorded condition, that indicates, for example, the temporary defect management area 155 is effective (i.e. in-use).

Figure 8C:
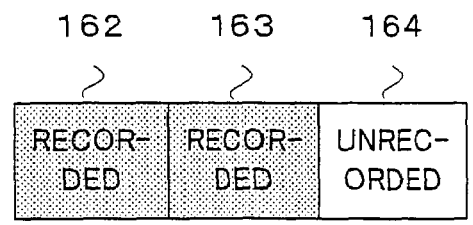

As shown in FIG. 8C, if the flag unit areas 162 and 163 are in the recorded condition and the flag unit area 164 is in the unrecorded condition, that indicates, for example, the temporary defect management area 174 is effective (i.e. in-use).

Figure 8D:
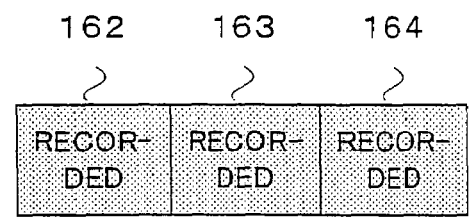

As shown in FIG. 8D, if all of the flag unit areas 162, 163, and 164 are in the recorded condition, that indicates, for example, the temporary defect management area 175 is effective (i.e. in-use).

Therefore, if, for example, a recording/reproducing apparatus described later is used to reproduce the optical disc 150 (or 100), it is possible to relatively easily search for the temporary defect management area in which the effective defect management information 120 is recorded. Therefore, it is possible to reduce a time length required for searching for the defect management information 120. As a result, it is possible to speed up the reproduction operation.

Even if the optical disc 150 is a write-once-type, it is possible to write the distinction information, as a combination pattern of the recorded condition and the unrecorded condition in the flag area 161, by changing the flag unit areas in the unrecorded condition in the flag area 161, which are assigned in advance according to the number of the temporary defect management areas, to the areas in the recorded condition by writing some information. By setting the flag unit areas to be in the recorded condition as described above, it is possible to appropriately record the distinction information as a recording pattern without recording the distinction information again in another position.

The association of the recording conditions of the flag unit areas 162, 163, and 164 with the in-use temporary defect management area indicated by these recording conditions is not limited to what is shown in FIG. 8. An arbitrary recording condition may be used if capable of distinguishing the in-use temporary defect management area.

Incidentally, in FIG. 7 and FIGS. 8, the two-layer optical disc 150 is used for the explanation, but even in the case of the one-layer optical disc 100, or other optical discs and various recording media provided with two or more temporary defect management areas, it is possible to obtain the same effect as that in the optical disc of the present invention.

(Example of Recording/Reproducing Apparatus)

Figure 9:
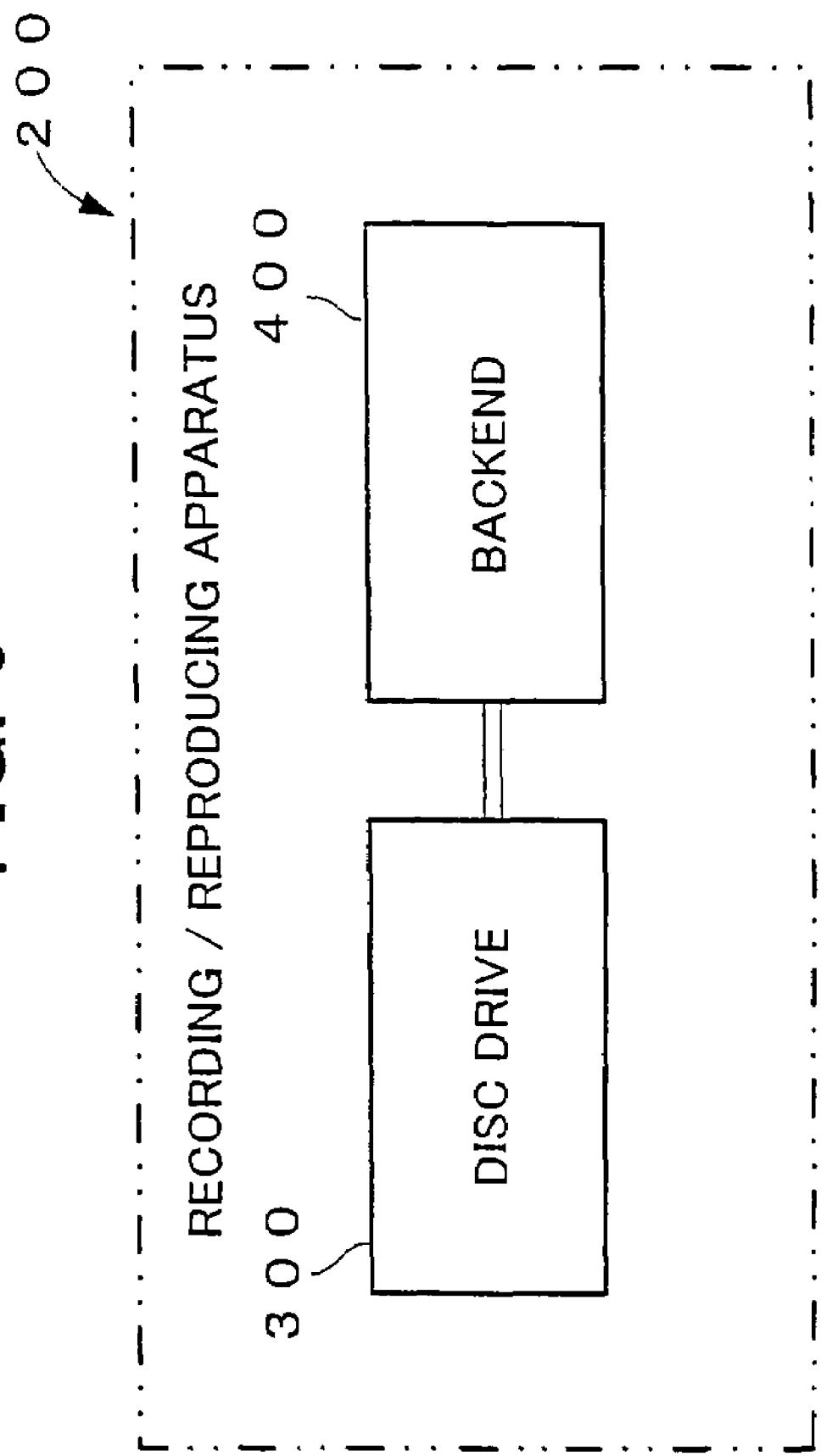
FIG. 9 is a block diagram showing a recording/reproducing apparatus which is an embodiment of a recording apparatus and a reproducing apparatus of the present invention.

Next, the structure of a recording/reproducing apparatus in the embodiment of the present invention will be explained. FIG. 9 shows the recording/reproducing apparatus 200, which is an embodiment of the present invention. The recording/reproducing apparatus 200 is provided with: a function of recording the record data onto the optical disc 100; and a function of reproducing the record data recorded on the optical disc 100.

The recording/reproducing apparatus 200 is provided with: a disc drive 300; and a backend 400.

Figure 10:
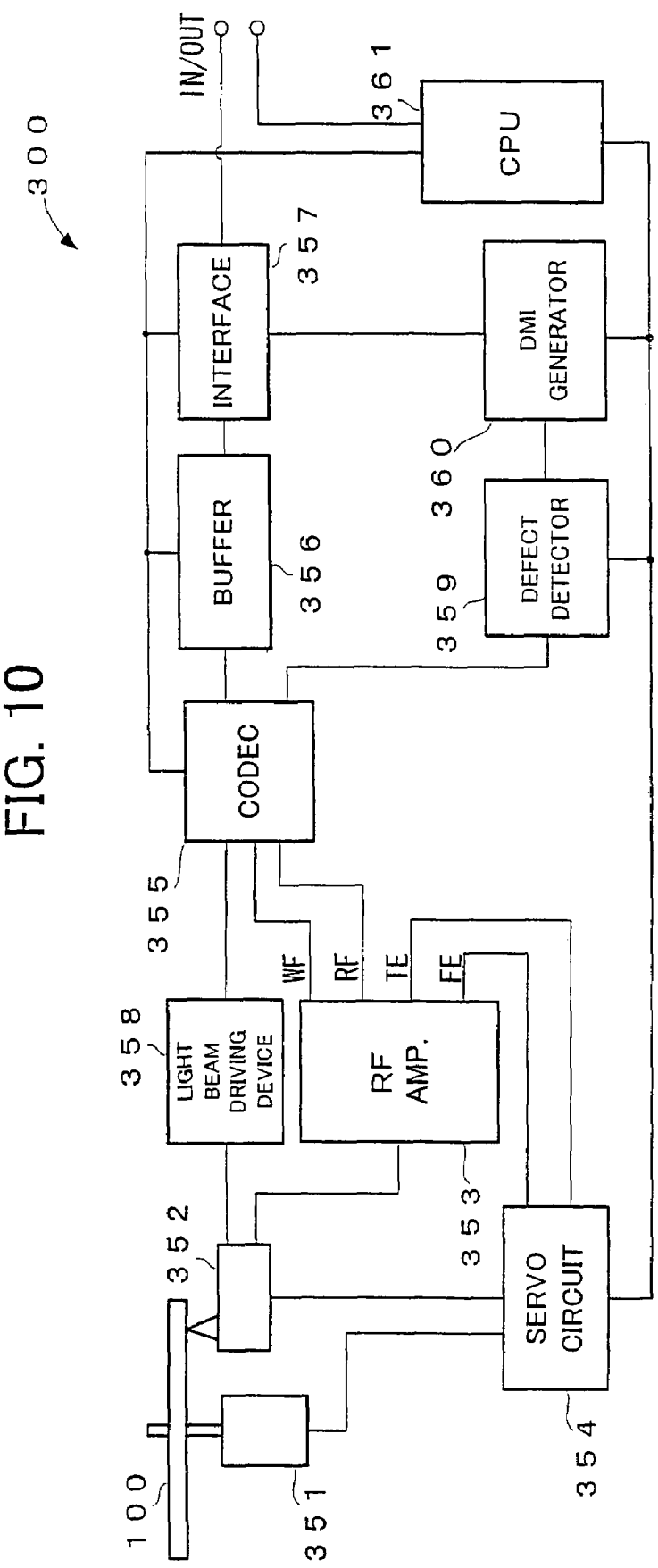
FIG. 10 is a block diagram showing a disc drive of the recording/reproducing apparatus in the embodiment.

FIG. 10 shows the inner structure of the disc drive 300. The disc drive 300 records record data onto the optical disc 100 and reads the record data recorded on the optical disc 100.

As shown in FIG. 10, the disc drive 300 is provided with: a spindle motor 351; an optical pickup 352; a Radio Frequency (RF) amplifier 353; and a servo circuit 354.

The spindle motor 351 is a motor for rotating the optical disc 100.

The optical pickup 352 records the record data or the like onto the recording surface of the optical disc 100 by irradiating a light beam onto the recording surface and reads the record data or the like recorded on the recording surface by receiving reflected light of the light beam. The optical pickup 352 outputs a RF signal corresponding to the reflected light of the light beam.

The RF amplifier 353 amplifies the RF signal outputted from the optical pickup 352 and outputs it to a CODEC. Moreover, the RF amplifier 353 makes, from the RF signal, a wobble frequency signal WF, a track error signal TE, and a focus error signal FE, and outputs them.

The servo circuit 354 is a servo control circuit for controlling the operating of the optical pickup 352 and the spindle motor 351 on the basis of the track error signal TE, the focus error signal FE, and other servo control signals.

As shown in FIG. 10, the disc drive 300 is provided with: the CODEC 355; a buffer 356; an interface 357; and a light beam driving device 358.

The CODEC 355 is a circuit, provided with: a function of performing an error correction for the record data in reading; and a function of appending an error correction code or mark to the record data in recording so as to demodulate and decode the record data. Specifically, the CODEC 355 demodulates and decodes the RF signal outputted from the RF amplifier 353 in reading, performs an error correction for the decoded RF signal, and then outputs this to the buffer 356. Moreover, if the error correction is incapable or if the number of error-corrected codes exceeds a certain standard value as a result of performing the error correction for the decoded RF signal, the CODEC 355 generates an error signal for indicating that, and outputs this signal to a defect detector 359. In recording, the CODEC 355 appends the error correction code to the record data outputted from the buffer 356, demodulates and decodes this data to have a code suited to the optical characteristics or the like of the optical disc 100, and then outputs the decoded record data to the light beam driving device 358.

The buffer 356 is a memory circuit for storing the record data temporarily.

The interface 357 is a circuit for controlling the input/output or communication of the record data or the like between the disc drive 300 and the backend 400. Specifically, in reproducing, the interface 357 responds a request command from the backend 400 and outputs the record data outputted from the buffer 356 (i.e. the record data read from the optical disc 100) to the backend 400. In recording, the interface 357 receives the record data which is inputted from the backend 400 to the disc drive 300, and outputs this data to the buffer 356. The interface 357 responds a request command from the backend 400 and outputs all or part of the defect list maintained in a generator 360 for generating Defect Management Information (DMI generator 360) to the backend 400.

At the time of recording, the light beam driving device 358 generates a light beam driving signal corresponding to the record data outputted from the CODEC 355 and outputs this signal to the optical pickup 352. The optical pickup 352 modulates a light beam on the basis of the light beam driving signal and irradiates it onto the recording surface of the optical disc 100. This causes the recording of record data or the like on the recording surface.

As shown in FIG. 10, the disc drive 300 is provided with: the defect detector 359; and the DMI generator 360.

The defect detector 359 is a circuit for detecting a defect on the optical disc 100. The defect detector 359 generates a defect detection signal for indicating the presence or absence of a defect and outputs this signal. The defect detector 359 detects a defect on the basis of the result of the error correction of record data in reading information (in verifying or reproducing). As described above, if the error correction is incapable or if the number of error-corrected codes exceeds the certain standard value as a result of performing the error correction for the decoded RF signal, the CODEC 355 generates the error signal for indicating that fact, and outputs this signal to the defect detector 359. The defect detector 359 outputs the defect detection signal for indicating the presence of a defect when receiving this error signal.

The DMI generator 360 is a circuit for generating or updating the defect management information 120 on the basis of the defect detection signal outputted from the defect detector 359. The defect management information 120 is rewritably stored into a memory circuit placed in the DMI generator 360. The DMI generator 360 responds to a request command from the backend 400 and outputs the defect management information 120 to the backend 400 through the interface 357.

As shown in FIG. 10, the disc drive 300 is equipped with a CPU 361. The CPU 361 controls the disc drive 300 as a whole, and controls the exchange of information among the elements in the disc drive 300 described above. The CPU 361 also controls the record operation and the reading operation of the record data and the defect management information 120. The CPU 361 responds to a control command or a request commend transmitted from the backend 400 and controls the exchange of data between the disc drive 300 and the backend 400.

Figure 11:
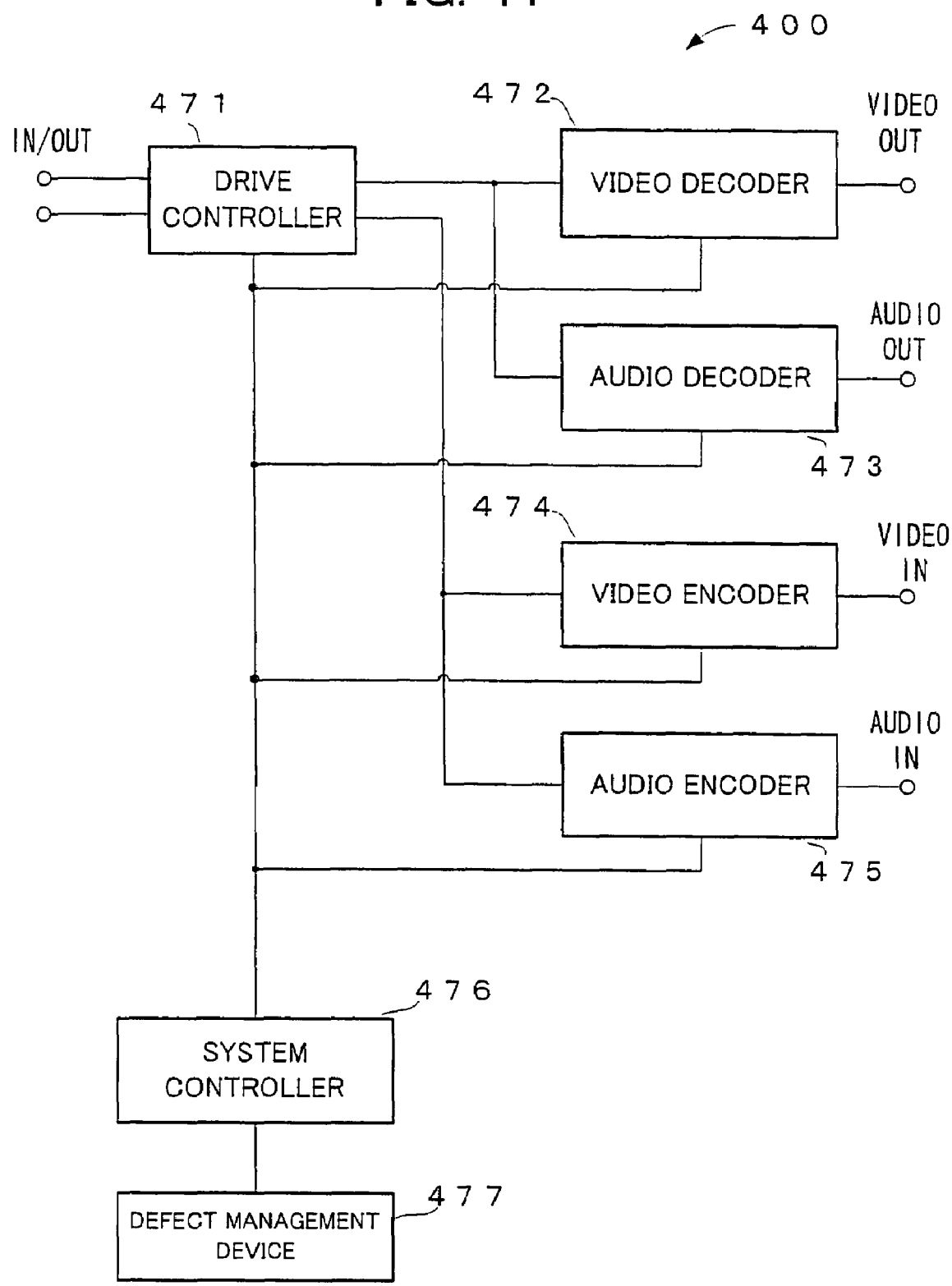
FIG. 11 is a block diagram showing a backend of the recording/reproducing apparatus in the embodiment.

FIG. 11 shows the inner structure of the backend 400. The backend 400 is an apparatus for reproducing the record data read from the optical disc 100 with the disc drive 300, receiving the record data supplied from the outside for the purpose to record it onto the optical disc 100, encoding this record data, and transmitting it to the disc drive 300.

The backend 400 is provided with: a drive controller 471; a video decoder 472; an audio decoder 473; a video encoder 474; an audio encoder 475; a system controller 476; and a defect management device 477.

The drive controller 471 is a circuit for controlling the reading processing and recording processing of the disc drive 300. The backend 400 and the disc drive 300 cooperate and perform an operation of reading the record data from the optical disc 100 and reproducing it and an operation of receiving the record data from the outside and recording it onto the optical disc 100. The drive controller 471 realizes the cooperation of the backend 400 and the disc drive 300 by controlling the reading processing and recording processing of the disc drive 300. Specifically, the drive controller 471 outputs to the disc drive 300 request commands about reading, recording, outputting the record data from the buffer 356, outputting the defect management information 120 from the DMI generator 360, and so on. The drive controller 471 also controls the input and output of the record data, the defect management information 120, and other various information.

The video decoder 472 and the audio decoder 473 are circuits for decoding the record data which is read from the optical disc 100 by the disc drive 300 and which is supplied through the drive controller 471 and converting the record data to be reproducible with a display, a speaker, or the like.

The video encoder 474 and the audio encoder 475 are circuit for receiving a video signal, an audio signal, or the like inputted from the outside for the purpose of recording them on the optical disc 100, encoding them by Moving Picture Experts Group (MPEG) compressing and encoding method or the like, and supplying them to the disc drive 300 through the drive controller 471.

In reproducing, the system controller 476 controls: the drive controller 471; the video decoder 472; the audio decoder 473; and the defect management device 477, to thereby reproduce the record data in cooperation with these devices. In recording, the system controller 476 controls: the drive controller 471; the video encoder 474; the audio encoder 475; and the defect management device 477, to thereby record the record data in cooperation with these devices. In reproducing and recording, the system controller 476 controls the disc drive 300 (e.g. controls the generation and transmission of various request commands, the reception of a response signal, or the like) with the drive controller 471 in order to realize the cooperation of the disc drive 300 and the backend 400.

The defect management device 477 has therein a memory circuit and has a function of receiving and maintaining all or part of the defect management information 120 made or updated by the DMI generator 360 in the disc drive 300. The defect management device 477 performs the defect management with the system controller 476.

Figure 12:
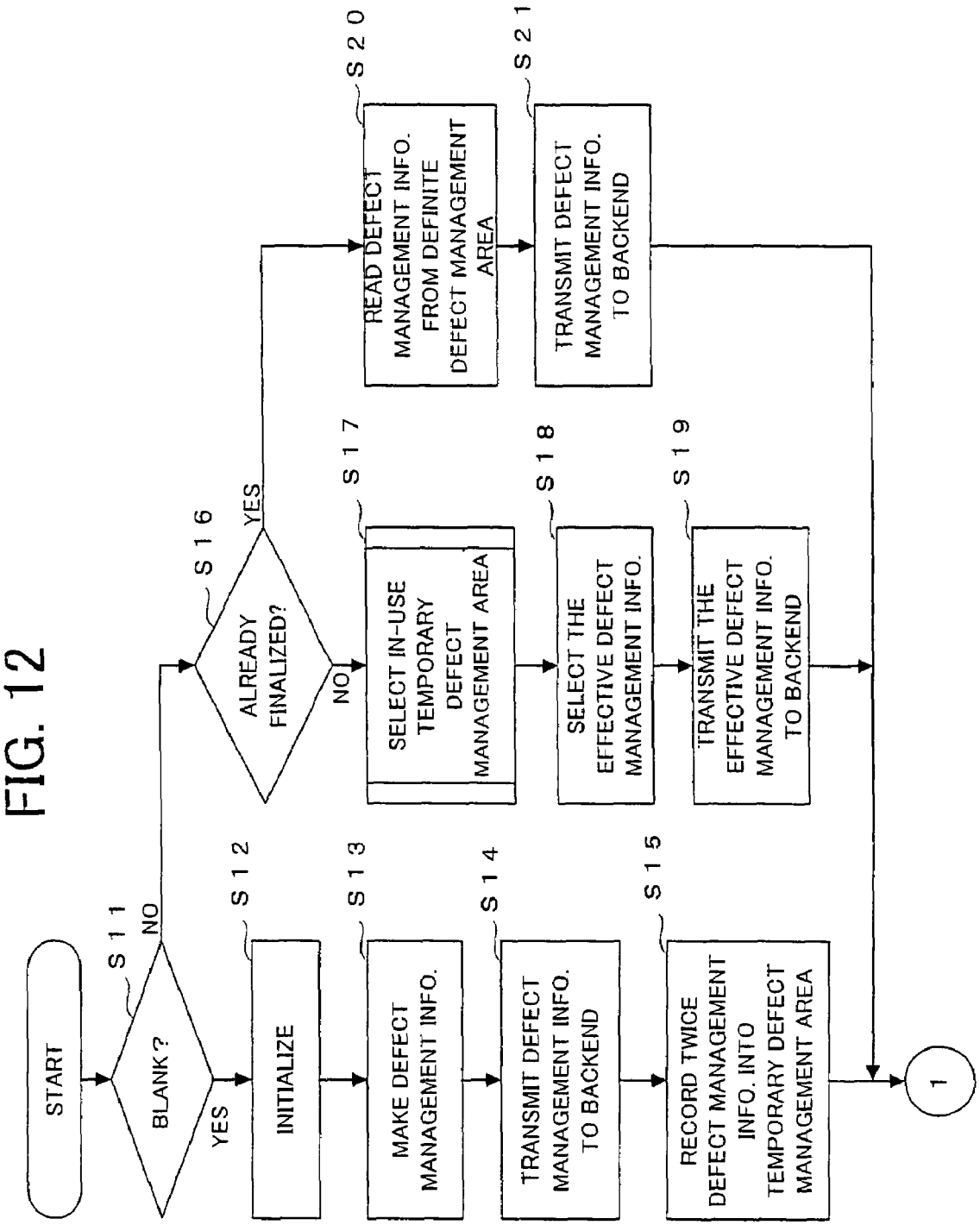
FIG. 12 is a flowchart showing an initial setting operation of the recording/reproducing apparatus in the embodiment.

Next, an initial setting operation of the recording/reproducing apparatus 200 will be explained. FIG. 12 shows an initial setting operation of the recording/reproducing apparatus 200. The recording/reproducing apparatus 200 performs the initial setting between (i) when the optical disc 100 is inserted or loaded in the disc drive 300 and (ii) when the record data is recorded or reproduced. The initial setting is processing for preparing for the recording or reproducing of the record data and includes various processing. Out of the processing, the initialization of the optical disc 100, the generation of the defect management information 120, the transmission of the defect management information 120 to the backend 400, or the like will be explained below. The processing is performed mainly under the control of the CPU 361 of the disc drive 300.

As shown in FIG. 12, when the optical disc 100 is inserted or loaded into the disc drive 300, the CPU 361 of the disc drive 300 judges whether or not the optical disc 100 is an unrecorded disc, i.e., a blank disc (step S11).

If the optical disc 100 is a blank disc (the step S11: YES), the CPU 361 initializes the optical disc 100 (step S12). In this initializing, the DMI generator 360 generates the defect management information 120 (step S13). Specifically, it obtains the start address and end address of the user data area 108 and the sizes of the spare areas 109 and 110, which are set in the initializing, and generates the setting information 121. Moreover, it generates the defect list 122. The defect list 122 generated at this time has only an outline, not having any content. Namely, the defect address is not recorded in it, nor is the specific spare address. A head, identification information, or the like are only recorded. The generated defect management information 120 is stored into and maintained in the DMI generator 360.

Then, the CPU 361 transmits the defect management information 120 stored in the DMI generator 360 to the backend 400 (step S14). The defect management information 120 is stored into the defect management device 477 of the backend 400.

Then, the CPU 361 records the defect management information 120 stored in the DMI generator 360 twice repeatedly or redundantly into the temporary defect management area 104 or 105 on the optical disc 100 (step S15). In this case, it is preferable to specify the temporary defect management area in which the defect management information 120 is recorded first in advance, by default.

On the other hand, if the optical disc 100 is not a blank disc (the step S11: NO), the CPU 361 judges whether or not the optical disc 100 is already finalized (step S16). The finalizing is processing for arranging a recording format so that the optical disc 100 can be reproduced by a reproducing apparatus for a general rewritable-type optical disc and a reproducing apparatus for a general optical disc of a reproduce only type. It is possible to recognize whether or not the optical disc 100 is already finalized by referring to the control information recorded in the lead-in area 101 or the like.

If the optical disc 100 is not finalized yet (the step S16: NO), the CPU 361 selects the in-use temporary defect management area 104 or 105 (step S17). Namely, it selects the temporary defect management area 104 or 105 in which the effective defect management information 120 is included.

Particularly in the embodiment, at the time of selecting the in-use temporary defect management area in the step S17, the CPU 361 efficiently detects and selects the temporary defect management area in which the effective defect management information 120 is recorded, by referring to the flag area 111. Such an operation will be described in detail later (refer to FIG. 13).

Moreover, if a plurality of defect management information 120 is recorded in the temporary defect management area 104 or 105 selected in the step S17 (refer to FIG. 4), the CPU 361 selects and reads the effective defect management information 120 among them (step S18). Namely, at a stage before the finalizing, the defect management information 120 is recorded in the temporary defect management area 104 or 105 whenever it is updated. The plurality of defect management information 120 is arranged in series in the updated order. Therefore, the defect management information placed at the end is the effective defect management information in the temporary defect management area 104 or 105. The CPU 361 selects and reads the defect management information placed at the end.

In order to specify the defect management information 120 placed at the end (or the last defect management information 120), the embodiment adopts the following method. Namely, in the case where a plurality of defect management information 120 are already recorded sequentially in a row in the temporary defect management area 104 or 105, information is recorded from the start address of the temporary defect management area 104 or 105 to the end address of the area in which the last defect management information 120 is recorded, and the subsequent area is unrecorded or blank. The CPU 361 controls the optical pickup 352 and scans the temporary defect management area 104 or 105, starting from the start address. Then, it detects a position from which an unrecorded or blank condition starts and scans backward the temporary defect management area 104 or 105 from the position. This is how to specify the last defect management information 120. By this type of method, it is possible to easily specify the last or latest defect management information 120 (i.e. the effective defect management information 120) without using a pointer or the like.

The CPU 361 stores the read effective defect management information 120 into the DMI generator 360 and transmits this information to the backend 400 (step S19). The effective defect management information 120 is stored into the defect management device 477 of the backend 400.

On the other hand, if the optical disc 100 is not a blank disc but is already finalized (the step S16: YES), the CPU 361 reads the defect management information 120 from the definite defect management area 106 or 107 (step S20), and transmits this information to the backend 400 (step S21). The defect management information 120 is stored into the defect management device 477 of the backend 400.

As described above, the defect management information 120 is generated, or is selectively read from the temporary defect management area 104 or 105, or is read from the definite defect management area 106 or 107. Then, it is stored into the DMI generator 360 of the disc drive 300 and is stored into the defect management device 477 of the backend 400. This completes the preparation for the defect management and ends the initial setting.

Figure 13:
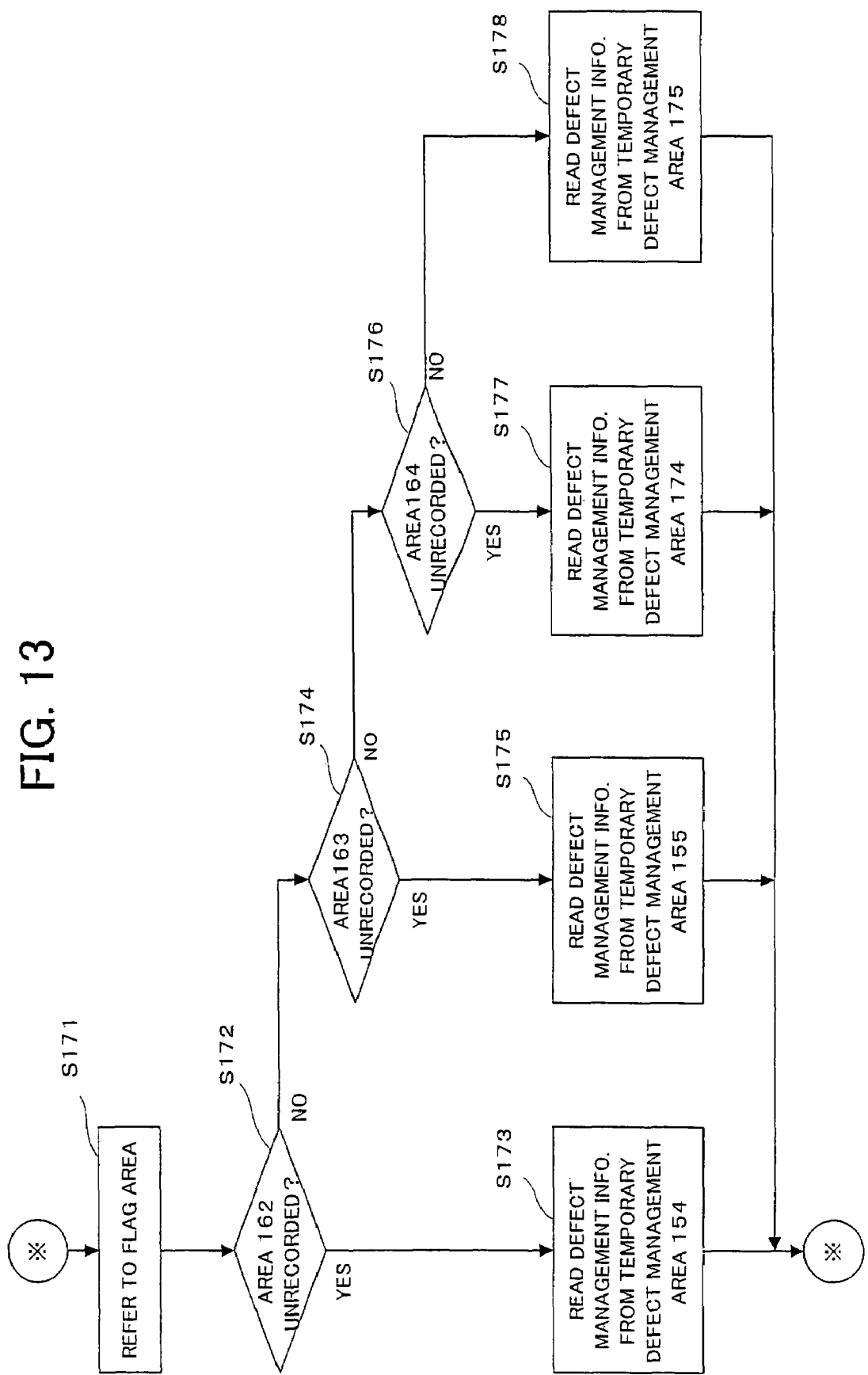
FIG. 13 is a flowchart showing a section operation of the in-use temporary defect management area of the recording/reproducing apparatus in the embodiment.

Next, the detail of the operation of "selecting the in-use temporary defect management area" in the step S17 in FIG. 12 will be explained with reference to FIG. 13. FIG. 13 is a flowchart showing such an operation of selecting. Incidentally, for convenience of explanation, the two-layer optical disc 150 shown in FIG. 6 will be used for the explanation in place of the optical disc 100. In addition, on the assumption that the association of the distinction information of the flag area 161 with the in-use temporary defect management area indicated by the distinction information is the same as shown in FIG. 8, the explanation below will go on.

As shown in FIG. 13, the CPU 361 reads the flag area 161 of the optical disc 150 and refers to the recording conditions of the flag unit areas (refer to FIG. 7) included in the flag area 161 (step S171).

Then, it is judged by the operation of the CPU 361 whether or not the flag unit area 162 is in the unrecorded condition (step S172).

As a result, if it is judged that the flag unit area 162 is in the unrecorded condition (the step S172: Yes), that means the flag area 161 shows the recording condition shown in FIG. 8A. Therefore, the temporary defect management area 154 is selected by the CPU 361 as the in-use temporary defect management area (step S173).

On the other hand, if it is judged that the flag unit area 162 is not in the unrecorded condition (the step S172: No), then, it is judged whether or not the flag unit area 163 is in the unrecorded condition (step S174).

As a result, if it is judged that the flag unit area 163 is in the unrecorded condition (the step S174: Yes), that means the flag area 161 shows the recording condition shown in FIG. 8B. Therefore, the temporary defect management area 155 is selected by the CPU 361 as the in-use temporary defect management area (step S175).

On the other hand, if it is judged that the flag unit area 163 is not in the unrecorded condition (the step S174: No), then, it is judged whether or not the flag unit area 164 is in the unrecorded condition (step S176).

As a result, if it is judged that the flag unit area 164 is in the unrecorded condition (the step S176: Yes), that means the flag area 161 shows the recording condition shown in FIG. 8C. Therefore, the temporary defect management area 174 is selected by the CPU 361 as the in-use temporary defect management area (step S177).

On the other hand, if it is judged that the flag unit area 164 is not in the unrecorded condition (the step S176: No), that means the flag area 161 shows the recording condition shown in FIG. 8D. Therefore, the temporary defect management area 175 is selected by the CPU 361 as the in-use temporary defect management area (step S178).

Therefore, it is possible to search for the in-use temporary defect management area relatively easily and efficiently by referring to the flag area 161. Namely, conventionally, it is necessary to access all the temporary defect management areas and search for the in-use temporary defect management area, thoroughly. However, according to this embodiment, it is unnecessary to search for it thoroughly, as described above, so that it is possible to speed up the initial operation in loading the disc (or the reproduction operation and the record operation), for example.

Particularly, since the flag area 161 is included in the lead-in area 151, when the optical disc 150 is loaded, it is possible to select the in-use temporary defect management area as one portion of the initial operation. Therefore, after that, it is possible to perform the normal reproduction or record operation without paying attention to the selection of the temporary defect management area.

Figure 14:
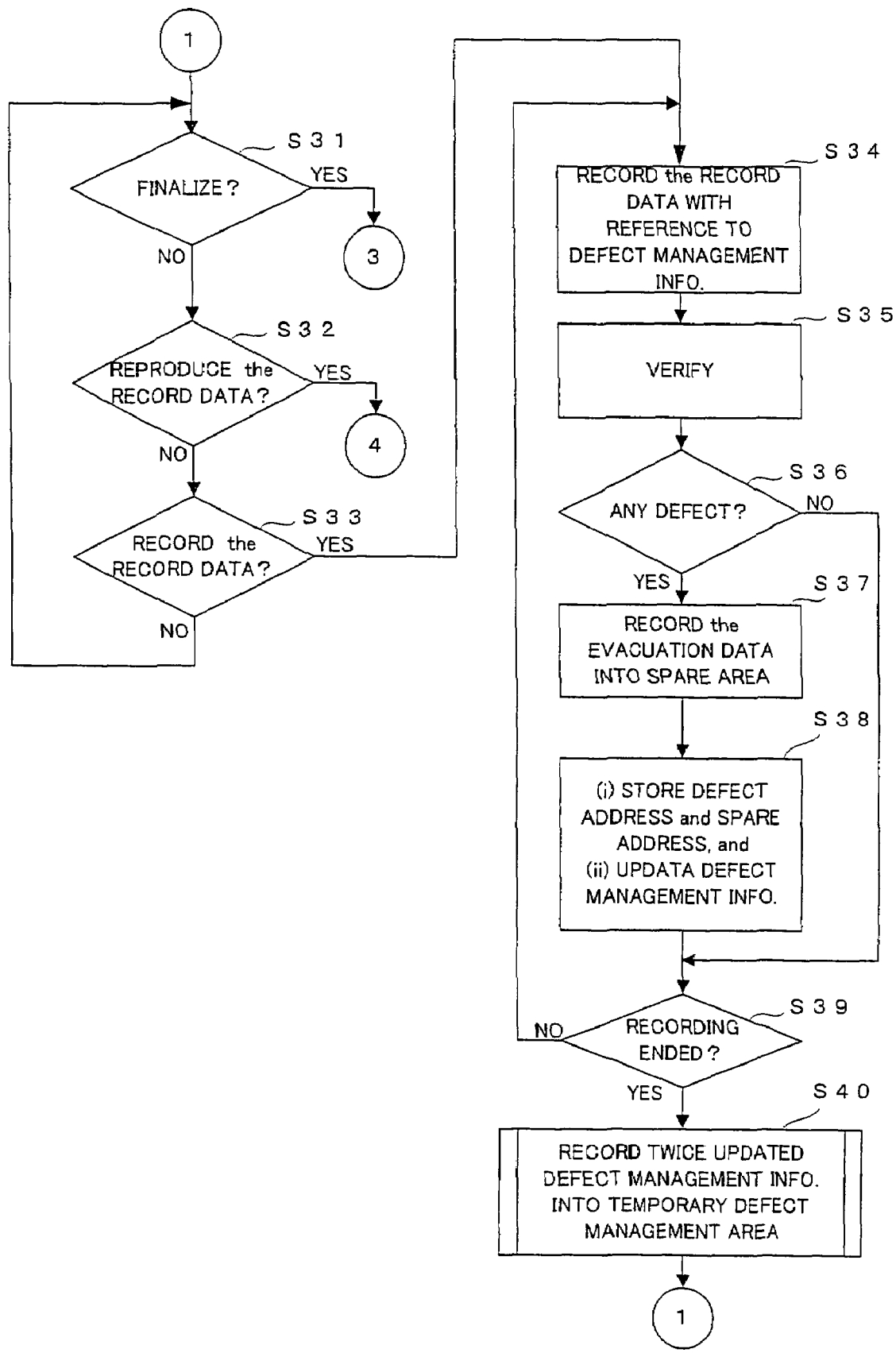
FIG. 14 is a flowchart showing a record operation or the like of the recording/reproducing apparatus in the embodiment.

Next, a record operation of the recording/reproducing apparatus 200 will be explained. FIG. 14 mainly shows a record operation of the recording/reproducing apparatus 200. The recording/reproducing apparatus 200 performs a record operation of recording the record data into the user data area 108 on the optical disc 100. The recording/reproducing apparatus 200 performs the record operation while performing the defect management. The recording/reproducing apparatus 200 performs verifying during the record operation and updates the defect list 122 on the basis of the verifying. The record operation is realized by the cooperation of the CPU 361 of the disc drive 300 and the system controller 376 of the backend 400.

As shown in FIG. 14, after judging whether or not an instruction of finalizing or reproducing the record data from the optical disc 100 is given (steps S31 and S32), when a user inputs an instruction of starting to record (step S33: YES), the recording/reproducing apparatus 200 responds to this and records the record data (step S34). The record data is recorded into each predetermined block. The recording/reproducing apparatus 200 refers to the defect management information stored in the defect management device 477 of the backend 400 and records the record data while performing the defect management on the basis of the information.

The recording/reproducing apparatus 200 performs verifying at each time of the one block recording or at each time of ending a series of writing sequences (step S35), and updates the defect management information 120 on the basis of the result of the verifying. Incidentally, the defect management information 120 which is updated is the defect management information stored in the DMI generator 360 of the disc drive 300. Specifically, when it is recognized, as a result of the verifying, that the record data fails to be record (step S36: YES), the CPU 361 of the disc drive 300 records the record data that fails to be recorded into the spare area 109 or 110 (step S37). Then, the CPU 361 estimates that there is a defect in a place in which the record data is supposed to be recorded, and records the defect address for indicating the place and the corresponding spare address onto the defect list 122 (step S38). The operation of making the defect address and the spare address will be described in detail later.

When the above-described steps S34 to S38 end with respect to a series block of the record data to be recorded this time (step S39: Yes), the CPU 361 records the updated defect management information 120 twice repeatedly or redundantly into the temporary defect management area 104 or 105 on the optical disc 100 (step S40).

Here, the defect management information 120 is recorded into the in-use temporary defect management area, but if there is no free space (or unrecorded space) in the in-use temporary defect management area, it is recorded into another temporary defect management area. In addition, in that case, it is preferable that the flag unit areas of the flag area 111 are updated at the same time (i.e. at least one of them is/are changed to be in the recorded condition). Such a record operation will be described in detail later (refer to FIG. 15).

Incidentally, the defect management information 120 recorded in the temporary defect management area 104 or 105 is the defect management information 120 stored in the DMI generator 360. Then, the record operation is completed.

Figure 15:
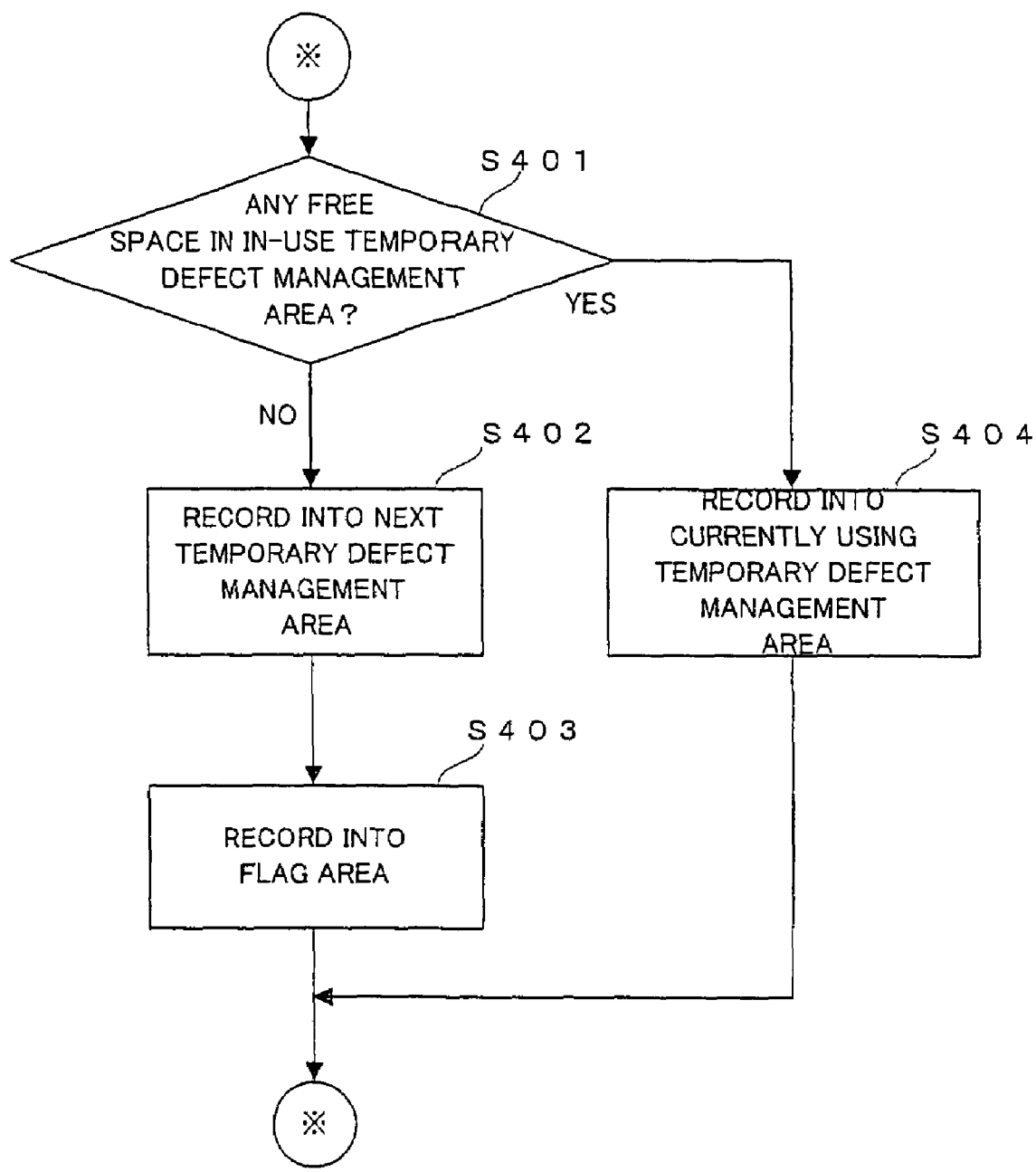
FIG. 15 is a flowchart showing the record operation of the defect management information and a record operation into the flag area on the recording/reproducing apparatus in the embodiment.

Next, the detail of the additional or sequential or postscript recording into the temporary defect management area 104 or 105 in the step S40 in FIG. 14 will be explained with reference to FIG. 15. FIG. 15 is a flowchart showing the additional or sequential or postscript recording of the defect management information 120 into the temporary defect management area 104 or 105.

As shown in FIG. 15, firstly, it is judged by the operation of the CPU 361 whether or not there is any free space in the temporary defect management area 104 or 105 into which the defect management information 120 is about to be recorded (step S401). Namely, it is judged whether or not there is any free space for further recording therein the defect management information 120 in such an area that is indicated by the flag area 111 (or 161) to be the in-use temporary defect management area.

As a result of the judgment, if it is judged that there is a free space (the step S401: Yes), the defect management information 120 is recorded into the currently in-use temporary defect management area (step S404).

On the other hand, if it is judged that there is not any free space (the step S401: No), the defect management information 120 is recorded into the temporary defect management area to be used next (step S402). For example, in the case of the optical disc 100 (refer to FIG. 1), if the temporary defect management area 104 is in use and has no free space to record the defect management information 120, the temporary defect management area 105 is selected to be the temporary defect management area to be used next, and the defect management information 120 is recorded into the temporary defect management area 105. Alternatively, in the case of the optical disc 150 (refer to FIG. 6), if the temporary defect management area 154 is in use and has no free space to record the defect management information 120, any one of the other temporary defect management areas 155, 174, and 175 is selected to be the temporary defect management area to be used next. Incidentally, the temporary defect management area to be used next may be determined in advance, or may be selected by the CPU 361 at the time point of the step S402, for example.

The CPU 361 further allows the data to be recorded into the flag area 111 (161) (step S403). Namely, it allows at least one of the recording conditions of the flag unit areas which are provided for the flag area 111 (161), to be changed into the recorded condition. For example, it is assumed that on the optical disc 150, the temporary defect management area 154 is in use, and the defect management information 120 is recorded into the temporary defect management area 155 in this time by the operation of the step S402. In this case, the data is recorded so that the flag unit area 162 of the flag area 161 is in the recorded condition.

By this, if the in-use temporary defect management area has to be changed during the record operation, it is possible to realize the flag area 111 (161) having the distinction information which reflects the change.

Incidentally, if the flag unit area 162 or the like is set to be in the recorded condition, the pits may be formed, not only by writing arbitrary data but also by writing the predetermined record data. For example, it may be constructed such that the flag unit area is set to be in the recorded condition by recording the backup data of an important file.

Figure 16:
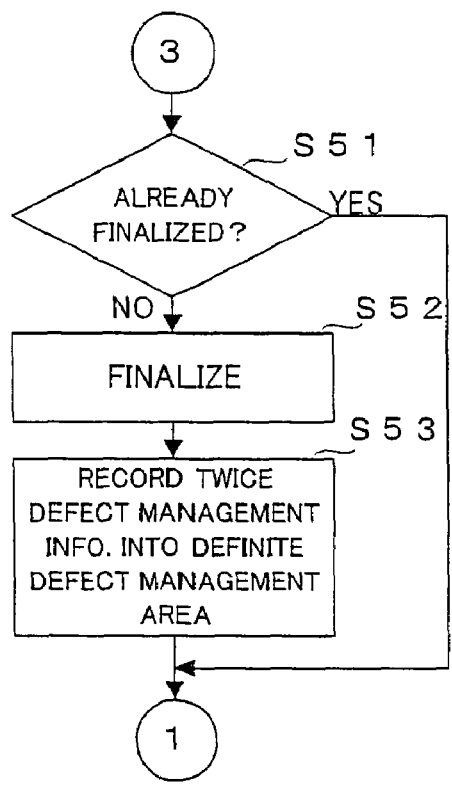
FIG. 16 is a flowchart showing the finalizing of the recording/reproducing apparatus in the embodiment.

Next, the finalizing operation of the recording/reproducing apparatus 200 will be explained. FIG. 16 shows the finalizing operation of the recording/reproducing apparatus 200. For example, when the user inputs an instruction for finalizing (the step S31 in FIG. 14: YES), as shown in FIG. 16, the recording/reproducing apparatus 200 confirms that the optical disc 100 is not finalized yet (step S51: NO) and finalizes the optical disc 100 (step S52). During finalizing, the recording/reproducing apparatus 200 records the defect management information 120 twice repeatedly or redundantly into the definite defect management area 106 or 107 on the optical disc 100 (step S53). The recording of the defect management information 120 may be performed once, or three times or more. Incidentally, the defect management information 120 recorded in the definite defect management area 106 or 107 is the defect management information 120 stored in the DMI generator 360. Then, the finalizing operation is completed.

Figure 17:
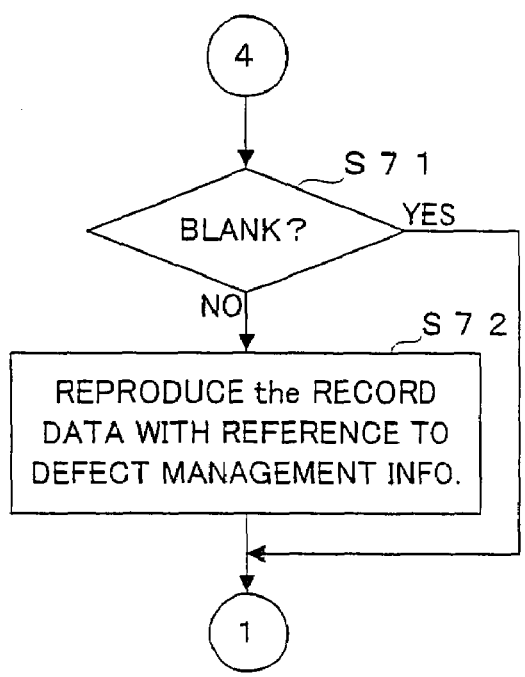
FIG. 17 is a flowchart showing a reproduction operation of the recording/reproducing apparatus in the embodiment.

Next, a reproduction operation of the recording/reproducing apparatus 200 will be explained. FIG. 17 shows a reproduction operation of the recording/reproducing apparatus 200.

When the user inputs an instruction of starting to reproduce (the step S32 in FIG. 14: YES), as shown in FIG. 17, the recording/reproducing apparatus 200 confirms that the optical disc 100 is not a blank disc (the step S71: NO), and reproduces the record data recorded in the user data area 108 on the optical disc 100 (step S72). The recording/reproducing apparatus 200 reproduces the record data while performing the defect management on the basis of the defect management information 120 stored in the defect management device 477 of the backend 400.

As described above, according to the recording/reproducing apparatus 200, it records the defect management information 120 into the temporary defect management area 104 or 105 on the optical disc 100 before finalizing the optical disc 100, and it records the defect management information 120 into the definite defect management area 106 or 107 on the optical disc 100 when finalizing the optical disc 100. With respect to the optical disc 100 which is not finalized yet, the recording/reproducing apparatus 200 reads the defect management information 120 from the temporary defect management area 104 or 105 on the optical disc 100. With respect to the optical disc 100 which is already finalized, the recording/reproducing apparatus 200 reads the defect management information 120 from the definite defect management area 106 or 107 on the optical disc 100. This makes it possible to realize the recording or reproducing of the record data while performing the appropriate defect management with respect to both the optical disc 100 which is not finalized yet and the optical disc 100 which is already finalized.

Particularly, by providing flag area 111 (161), it is possible to select the in-use temporary defect management area from the plurality of temporary defect management areas 104 and 105 (or 154, 155, 174, and 175) relatively easily and efficiently. Namely, it is possible to read the effective defect management information 120 relatively easily and efficiently. This makes it possible to reduce a processing load of the CPU 361 at the time of loading the disc, or reproducing and recording.

According to the recording/reproducing apparatus 200 of the present invention, it is constructed such that the defect management information 120 is recorded into the definite defect management area 106 or 107 on the optical disc 100 in the finalizing, which allows the compatibility between the write-once-type optical disc 100 and a general rewritable-type optical disc.

Incidentally, the drawings used for the explanation of the embodiments of the present invention embody constitutional elements or the like of the recording medium, recording apparatus or reproducing apparatus of the present invention, only for the purpose of explaining technical ideas thereof. The shape, size, position, connection relationship, and the like of various constitutional elements or the like are not limited to the drawings.

In addition, in the above-described embodiments, the optical disc 100 is explained as one example of the recording medium, and the recorder or the player associated with the optical disc 100 is explained as one example of the recording/reproducing apparatus. The present invention, however, is not limited to the optical disc and the recorder or the player for it. The present invention can be applied to other various information recording media for high density recording or high transfer rate; and a recorder or a player for the media.

The present invention is not limited to the above-mentioned embodiments, and various changes may be made, if desired, without departing from the essence or spirit of the invention which can be read from the claims and the entire specification. An information recording medium, a recording apparatus, a reproducing apparatus, a recording method, a reproducing method, and a computer program for making these functions, all of which involves such changes, are also intended to be within the technical scope of the present invention.

INDUSTRIAL APPLICABILITY

An information recording medium, a recording apparatus for and method for an information recording medium, a reproducing apparatus and method for an information recording medium, a computer program for recording or reproduction control, and a data structure including a control signal, all of which are according to the present invention, can be applied to a high-density optical disc, such as an optical disc, a magnet disc and a magnet-optical disc, and further they can be applied to a DVD player, a DVD recorder, and the like. Moreover, they can be applied to an information recording medium, an information recording/reproducing apparatus, or the like, which are mounted on or can be connected to various computer equipment, for example.

The invention claimed is:

1. An information recording medium comprising:
   a data area for recording therein record data;
   a control information recording area to record therein information for controlling an operation of recording and/or reading in said data area, said control information recording area including a definite defect management area to record therein defect management information of said data area;
   a plurality of temporary defect management areas for temporarily recording therein defect management information of said data area; and
   a flag area for recording therein distinction information for distinguishing a temporary defect management area in which the defect management information that is effective is recorded, from said plurality of temporary defect management areas,
   at least one of said plurality of temporary defect management areas is located between said control information recording area and said data area.

2. The information recording medium according to claim 1,
   said flag area being located in said control information recording area.

3. A recording apparatus for recording record data onto an information recording medium comprising: (i) a data area for recording therein the record data; (ii) a control information recording area to record therein information for controlling an operation of recording and/or reading in said data area, said control information recording area including a definite defect management area to record therein defect management information of said data area; (iii) a plurality of temporary defect management areas for temporarily recording therein defect management information of said data area; and (iv) a flag area for recording therein distinction information for distinguishing a temporary defect management area in which the defect management information that is effective is recorded, from said plurality of temporary defect management areas, (v) at least one of said plurality of temporary defect management areas is located between said control information recording area and said data area,
   said recording apparatus comprising:
   a first recording device for recording the record data into said data area;
   a second recording device for recording the defect management information into any one of said plurality of temporary defect management areas;
   a distinction information generating device for generating the distinction information on the basis of the recorded condition and the unrecorded condition of said plurality of temporary defect management areas; and
   a third recording device for recording the distinction information generated by said distinction information generating device into said flag area.

4. A recording method of recording record data onto an information recording medium comprising: (i) a data area for recording therein the record data; (ii) a control information recording area to record therein information for controlling an operation of recording and/or reading in said data area, said control information recording area including a definite defect management area to record therein defect management information of said data area; (iii) a plurality of temporary defect management areas for temporarily recording therein defect management information of said data area; and (iv) a flag area for recording therein distinction information for distinguishing a temporary defect management area in which the defect management information that is effective is recorded, from said plurality of temporary defect management areas, (v) at least one of said plurality of temporary defect management areas is located between said control information recording area and said data area,
   said recording method comprising:
   a first recording process of recording the record data into said data area;
   a second recording process of recording the defect management information into any one of said plurality of temporary defect management areas;
   a distinction information generating process of generating the distinction information on the basis of the recorded condition and the unrecorded condition of said plurality of temporary defect management areas; and
   a third recording process of recording the distinction information generated by said distinction information generating process into said flag area.

5. A reproducing apparatus for reproducing record data recorded on an information recording medium comprising: (i) a data area for recording therein the record data; (ii) a control information recording area to record therein information for controlling an operation of recording and/or reading in said data area, said control information recording area including a definite defect management area to record therein defect management information of said data area; (iii) a plurality of temporary defect management areas for temporarily recording therein defect management information of said data area; and (iv) a flag area for recording therein distinction information for distinguishing a temporary defect management area in which the defect management information that is effective is recorded, from said plurality of temporary defect management areas, (v) at least one of said plurality of temporary defect management areas is located between said control information recording area and said data area,
   said reproducing apparatus comprising:
   a first reading device for reading the distinction information recorded in said flag area;
   a selecting device for selecting effective one of said plurality of temporary defect management areas, on the basis of the distinction information read by said first reading device;
   a second reading device for reading the defect management information recorded in the effective temporary defect management area selected by said selecting device; and
   a reproducing device for reproducing the record data recorded in said data area, on the basis of the defect management information read by said second reading device.

* * * * *